United States Patent
Iwamoto et al.

(10) Patent No.: US 9,052,784 B2
(45) Date of Patent: Jun. 9, 2015

(54) DETECTING SENSOR, INDICATOR POSITION DETECTING DEVICE, AND METHOD FOR MANUFACTURING DETECTING SENSOR

(75) Inventors: Naohisa Iwamoto, Saitama (JP); Yasuo Oda, Saitama (JP); Yoshihisa Sugiyama, Saitama (JP); Takenori Kaneda, Tochigi (JP)

(73) Assignee: Wacom Co., Ltd., Saitama (JP)

( * ) Notice: Subject to any disclaimer, the term of this patent is extended or adjusted under 35 U.S.C. 154(b) by 876 days.

(21) Appl. No.: 13/296,662

(22) Filed: Nov. 15, 2011

(65) Prior Publication Data

US 2012/0139561 A1  Jun. 7, 2012

(30) Foreign Application Priority Data

Dec. 1, 2010  (JP) ................... 2010-268062

(51) Int. Cl.
G06F 3/041 (2006.01)
G01R 27/26 (2006.01)
G06F 3/044 (2006.01)

(52) U.S. Cl.
CPC ...... *G06F 3/044* (2013.01); *G06F 2203/04111* (2013.01); *G06F 2203/04103* (2013.01); *G06F 2203/04107* (2013.01)

(58) Field of Classification Search
CPC .......... G06F 3/044; G06F 2203/04107; G06F 2203/04111
USPC ........ 324/658–690; 345/173–178; 702/47, 52
See application file for complete search history.

(56) References Cited

U.S. PATENT DOCUMENTS

| 8,269,118 B2* | 9/2012 | Kuo et al. ................. 178/18.06 |
| 2005/0275415 A1 | 12/2005 | Sato et al. |
| 2009/0166100 A1 | 7/2009 | Matsubara |

(Continued)

FOREIGN PATENT DOCUMENTS

| CN | 201465085 U | 5/2010 |
| JP | 2005337773 A | 12/2005 |

(Continued)

OTHER PUBLICATIONS

Extended European Search Report dated Oct. 30, 2014, for corresponding EP Application No. 11191152.5-1507/2461240, 10 pages.

(Continued)

*Primary Examiner* — Melissa Koval
*Assistant Examiner* — Farhana Hoque
(74) *Attorney, Agent, or Firm* — Seed IP Law Group PLLC

(57) ABSTRACT

A detecting sensor is provided, including: on a base material, a plurality of first sensor conductors arranged in a first direction; a plurality of second sensor conductors arranged in a second direction intersecting the first direction; a plurality of first signal lines electrically connected to the first sensor conductors; a plurality of second signal lines electrically connected to the second sensor conductors; and a first conductive pattern disposed between the first signal lines and the base material, the first conductive pattern being electrically insulated from the first signal lines, the first conductive pattern being set to a predetermined potential, and the first conductive pattern being made of a same material as that used to form at least one of the first sensor conductors and the second sensor conductors.

19 Claims, 14 Drawing Sheets

(56) References Cited

U.S. PATENT DOCUMENTS

| | | |
|---|---|---|
| 2009/0244021 A1 | 10/2009 | Matsuo et al. |
| 2009/0244028 A1 | 10/2009 | Matsuo |
| 2010/0182275 A1 | 7/2010 | Saitou |

FOREIGN PATENT DOCUMENTS

| | | |
|---|---|---|
| JP | 2009162538 A | 7/2009 |
| JP | 2009169720 A | 7/2009 |
| JP | 2009259203 A | 11/2009 |
| JP | 2010-267223 A | 11/2010 |

OTHER PUBLICATIONS

Japanese Office Action dated Jul. 31, 2014, for corresponding JP Application No. 2010-268062, 3 pages.

* cited by examiner

F I G . 4
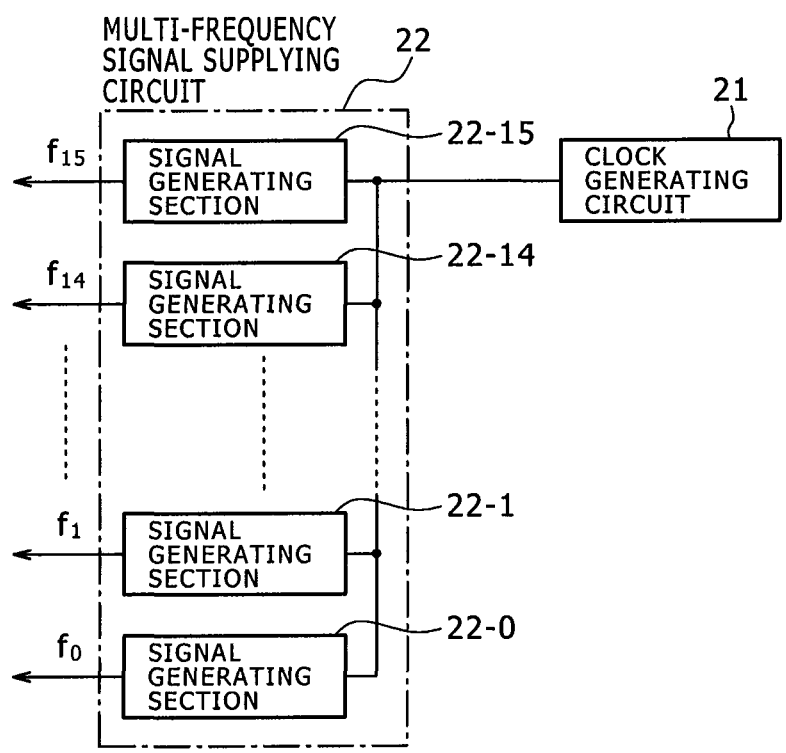

DETECTING SENSOR, INDICATOR POSITION DETECTING DEVICE, AND METHOD FOR MANUFACTURING DETECTING SENSOR

CROSS REFERENCE TO RELATED APPLICATION

The present application claims priority under 35 U.S.C. 119(a) of Japanese Application No. 2010-268062, filed Dec. 1, 2010, the entire content of which is incorporated herein by reference.

BACKGROUND OF THE INVENTION

1. Field of the Invention

The present invention relates to a detecting sensor mounted on a surface of a display screen and configured to detect the position of an indicator, a method for manufacturing the detecting sensor, and an indicator position detecting device incorporating the detecting sensor.

2. Description of the Related Art

A capacitance type input device has been known, which is disposed on the surface of a display screen of a liquid crystal display device to detect the touching position of a finger of a user or the like, and to input information corresponding to a displayed indicated image (see, for example, Japanese Patent Laid-Open No. 2009-259203 (pages 5 to 15 and FIGS. 1 to 11), hereinafter referred to as Patent Document 1). In the capacitance type input device, light transmitting electrode patterns that intersect each other are formed on the surface of a light transmitting substrate, and the position of a finger of a user is detected based on a change in capacitance, which occurs when the finger touches the surface.

SUMMARY OF THE INVENTION

In the capacitance type input device disclosed in Patent Document 1, metallic wiring pieces 9a respectively drawn out from a first light transmitting electrode pattern 11 and a second light transmitting electrode pattern 12, which intersect each other, are arranged adjacent to each other near an edge portion of a light transmitting substrate 15, and terminals 19a at end portions of the metallic wiring pieces 9a are connected to a flexible board 19. An area excluding the metallic wiring pieces 9a forms an input region 10a on the light transmitting substrate 15. However, when a finger of a user or the like touches a wiring region including the metallic wiring pieces 9a of the two kinds of light transmitting electrode patterns 11 and 12, which are arranged adjacent to each other, capacitance between the two kinds of light transmitting electrode patterns 11 and 12 changes similarly as if the finger of the user is touching the input region 10a. Thus, an input position is erroneously detected.

In one aspect, the present invention is directed to providing a detecting sensor capable of preventing erroneous detection when an indicator, such as a finger, touches a wiring region that surrounds an input region. The present invention is further directed to providing an indicator position detecting device incorporating such a detecting sensor, and a method for manufacturing such a detecting sensor.

According to an embodiment of the present invention, a detecting sensor is provided, which includes a plurality of first sensor conductors arranged in a first direction and a plurality of second sensor conductors arranged in a second direction, which intersects the first direction; on a base material. The detecting sensor further includes a plurality of first signal lines electrically connected to the first sensor conductors, a plurality of second signal lines electrically connected to the second sensor conductors, and a first conductive pattern disposed between the first signal lines and the base material. The first conductive pattern is electrically insulated from the first signal lines, and is set to a predetermined electric potential. The first conductive pattern may be made of the same material as the first sensor conductors or the second sensor conductors.

Accordingly, even when the first signal lines and the second signal lines are arranged adjacent to each other in a wiring region on the base material, the first conductive pattern set to the predetermined potential is formed to overlap the first signal lines and, therefore, even when an indicator approaches the region in which the first signal lines and the second signal lines are arranged adjacent to each other, signal interference between the first signal lines and the second signal lines can be reduced, and erroneous detection of the indicator can be prevented.

In one aspect, preferably, an insulating material is disposed between the first signal lines and the first conductive pattern to electrically insulate the first signal lines from the first conductive pattern. Further preferably, the plurality of first sensor conductors and the plurality of second sensor conductors are arranged on the same surface side of the base material, and the same insulating material as the insulating material disposed between the first signal lines and the first conductive pattern may be arranged in intersection regions between the first sensor conductors and the second sensor conductors. It then becomes possible to simultaneously form the insulating material for insulating the first sensor conductors from the second sensor conductors and the insulating material for insulating the first signal lines from the base material, to simplify the manufacturing process to thereby reduce manufacturing cost.

In another aspect, preferably, each of the first sensor conductors includes a plurality of conductor pieces, which are arranged between the plurality of second sensor conductors. Each of the first sensor conductors further includes one or more conductive elements disposed to overlap the insulating material in the intersection regions between the first sensor conductors and the second sensor conductors, respectively, such that each of the conductive elements electrically connects adjacent two of the plurality of conductor pieces to each other. It then becomes possible to form the first sensor conductors and the second sensor conductors as a single layer, to ensure their stable characteristics and to further simplify the manufacturing process to thereby reduce manufacturing cost.

In another aspect, preferably, the conductive elements described above may be formed of the same material as that used to form the first signal lines or the second signal lines. It then becomes possible to simultaneously form the conductive elements for electrically connecting the plurality of conductor pieces to each other and the first signal lines or the second signal lines, to still further simplify the manufacturing process to thereby reduce manufacturing cost.

In another aspect, preferably, the first signal lines and the second signal lines have higher conductivity than the first sensor conductors and the second sensor conductors. This would improve signal transmission characteristics by lowering the overall resistance of the first sensor conductors and the first signal lines as well as the overall resistance of the second sensor conductors and the second signal lines.

In another aspect, preferably, a second conductive pattern set to a predetermined potential is disposed between the first signal lines and the second signal lines, in a region where the second signal lines are arranged in the vicinity of the first signal lines. In addition, preferably, the second conductive pattern is disposed to overlap the first conductive pattern and is electrically connected to the first conductive pattern. The second conductive pattern disposed between the first signal lines and the second signal lines, which are adjacent to each other, can reduce signal interference in a region where the first signal lines adjoin the second signal lines, to thereby prevent erroneous detection of an indicator.

In another aspect, preferably, the second conductive pattern includes a first linear conductor and a second linear conductor each connected to a predetermined potential. The first linear conductor may be disposed to overlap the first conductive pattern to be electrically connected to the first conductive pattern, to be thereby set to a predetermined potential. It then becomes possible to further reduce electric coupling between the first signal lines, which correspond to the first linear conductor and the first conductive pattern, and the second signal lines, which correspond to the second linear conductor, to further reduce erroneous detection.

In another aspect, preferably, the first linear conductor of the second conductive pattern is formed to have a wider width than the second linear conductor. Accordingly, when the strength of signals input to and output from the first signal lines and the first sensor conductors is high for example, an electric field created by the first signal lines having the high signal strength can be effectively blocked (cut off) by the wide first linear conductor.

In another aspect, preferably, the first sensor conductors and the second sensor conductors have transparency, and so does an area of the base material in which the first sensor conductors and the second sensor conductors are arranged. It then becomes possible to arrange the detecting sensor over a display screen, to thereby enable position detection on the display screen.

According to a further embodiment of the present invention, an indicator position detecting device is provided, which includes a detecting sensor as described above for detecting a position indicated by an indicator; and an electric circuit configured to supply transmission signals to the detecting sensor and to detect a position indicated by the indicator based on received signals obtained from the detecting sensor.

Even in the case where the first signal lines and the second signal lines are arranged adjacent to each other in a wiring region on the base material of the detecting sensor, the first conductive pattern set to the predetermined potential is formed to overlap the first signal lines and, therefore, even when an indicator approaches the region in which the first signal lines and the second signal lines are arranged adjacent to each other, signal interference between the first signal lines and the second signal lines can be reduced, and erroneous detection of the indicator can be prevented.

According to a still further embodiment of the present invention, a method is provided for manufacturing a detecting sensor including a plurality of first sensor conductors arranged in a first direction and a plurality of second sensor conductors arranged in a second direction, which intersects the first direction, on one surface of a base material having transparency. The method includes generally six steps. First, a conductive film having transparency is formed on one surface of the base material using a metallic film forming process. Second, the plurality of second sensor conductors, a plurality of conductor pieces arranged between the plurality of second sensor conductors (to thereby form the plurality of first sensor conductors), and a first conductive pattern in a predetermined region are formed, by processing the conductive film. Third, an insulating material is disposed over the one surface of the base material. Fourth, the insulating material is left in each of regions between the conductor pieces, where the second sensor conductors are interposed between adjacent two of the conductor pieces, and also in a region of the first conductive pattern, by processing the insulating material. Fifth, a metallic film having higher conductivity than the conductive film is formed over the one surface of the base material, by a metallic film forming process. Sixth, the metallic film is processed such that the metallic film is left to overlap the insulating material, so as to electrically connect the plurality of conductor pieces to each other to form the first sensor conductors, to form first signal lines that are electrically connected to one ends of the first sensor conductors and that are disposed over the first conductive pattern with the insulating material interposed between the first signal lines and the first conductive pattern, and to form second signal lines that are electrically connected to one ends of the second sensor conductors.

With the detecting sensor manufactured according to various embodiments of the present invention, even in the case where the first signal lines and the second signal lines are arranged adjacent to each other in a wiring region on the base material, the first conductive pattern set to the predetermined potential is formed to overlap the first signal lines and, therefore, even when an indicator approaches the region in which the first signal lines and the second signal lines are arranged adjacent to each other, signal interference between the first signal lines and the second signal lines can be reduced, and erroneous detection of the indicator can be prevented.

BRIEF DESCRIPTION OF THE DRAWINGS

FIG. 4 is a diagram showing a detailed configuration of a multi-frequency signal supplying circuit;

DETAILED DESCRIPTION OF THE PREFERRED EMBODIMENTS

An indicator position detecting device according to exemplary embodiments of the present invention will hereinafter be described with reference to the drawings.

The use of ordinals such as first, second and third does not necessarily imply a ranked sense of order, but rather may only distinguish between multiple instances of a structure, act or value. For example, first and second groups may only distinguish between two groups, which may be interchangeable.

Figure 1:
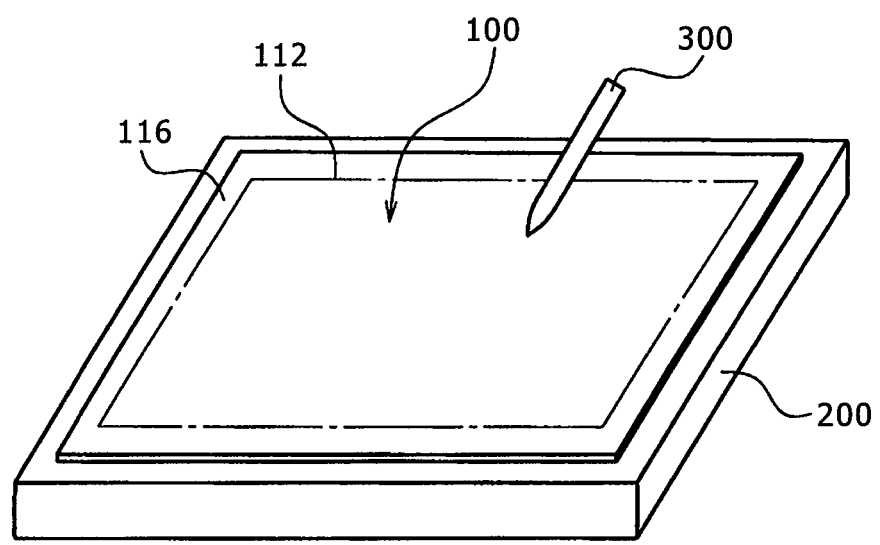
FIG. 1 is a diagram schematically showing an external shape of an indicator position detecting device according to an embodiment.

FIG. 1 is a diagram schematically showing an external shape of an indicator position detecting device according to an embodiment. The indicator position detecting device according to the present embodiment includes a display device 200, such as an LCD (Liquid Crystal Display) or the like, and a detecting sensor 100 for detecting a position indicated by an indicator 300 such as a finger of a user or the like. The detecting sensor 100 is disposed to overlap the display screen of the display device 200. As used herein, the "indicator" includes a pen, which has a conductor in its tip section and which is detected by drawing up an electrostatic field through a path via a human body to ground based on the same principle as that of finger detection, and a pen configured to itself transmit a signal.

In FIG. 1, the detecting sensor 100 has a detection region 112, though which the display screen of the display device 200 that the detecting sensor 100 overlaps is visible and which defines an area for detecting a position of the indicator 300. As illustrated, a wiring region 116 is set on the periphery of (i.e., to surround) the detection region 112.

Figure 2:
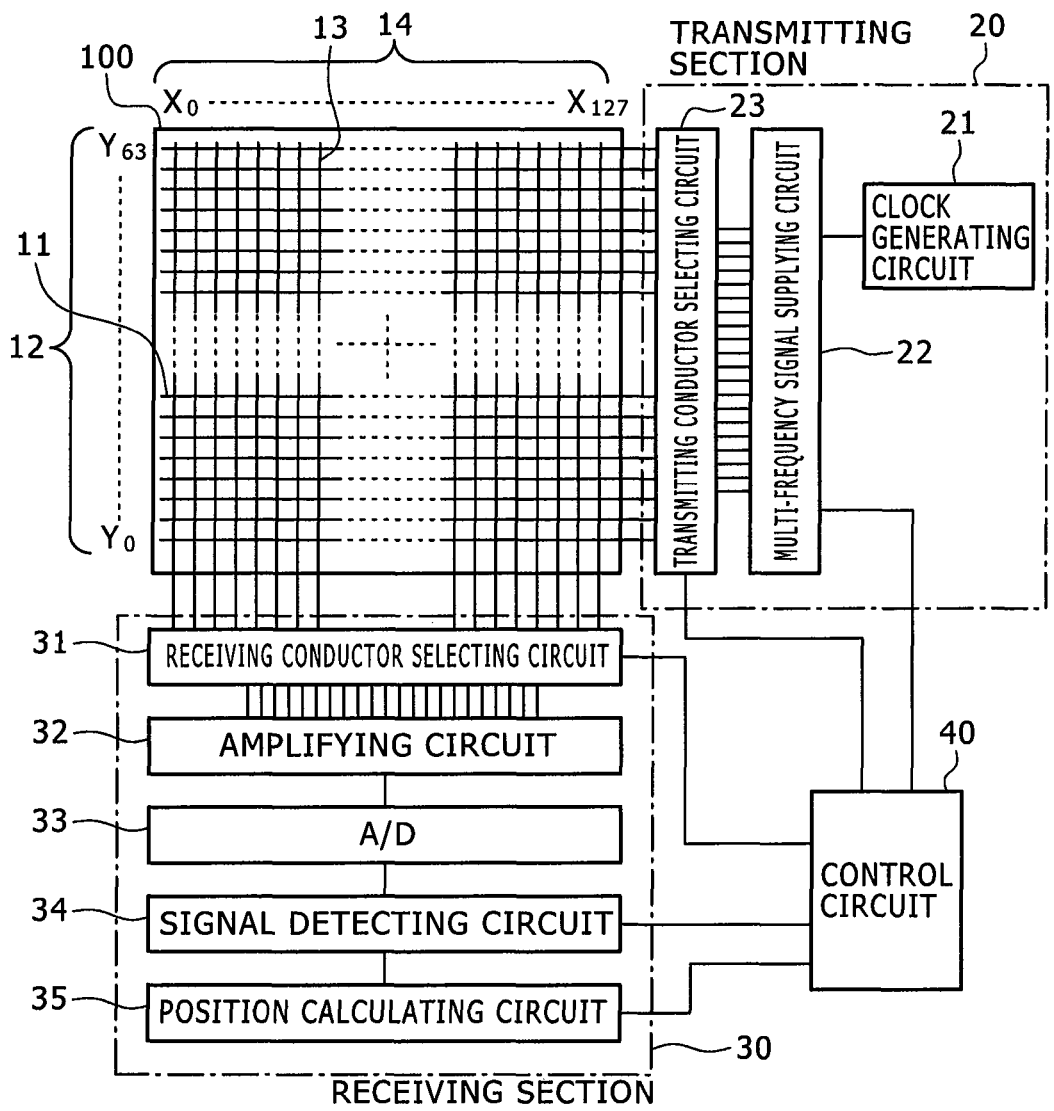
FIG. 2 is a diagram showing an overall configuration of the indicator position detecting device.

FIG. 2 is a diagram showing an overall configuration of the indicator position detecting device. As shown in FIG. 2, the indicator position detecting device includes the detecting sensor 100 and electric circuitry composed of a transmitting section 20, a receiving section 30, and a control circuit 40. The detecting sensor 100 has a conductor pattern formed of a transmitting conductor group 12 and a receiving conductor group 14. The transmitting conductor group 12 is formed of transmitting conductors 11 (i.e., first sensor conductors), which are a plurality of transparent conductors arranged at equal intervals in a predetermined direction (i.e., a first direction), and the receiving conductor group 14 is formed of receiving conductors 13 (i.e., second sensor conductors), which are a plurality of transparent conductors arranged at equal intervals in a direction (i.e., a second direction) orthogonal to the first direction in which the plurality of transmitting conductors 11 are arranged.

Figure 3:
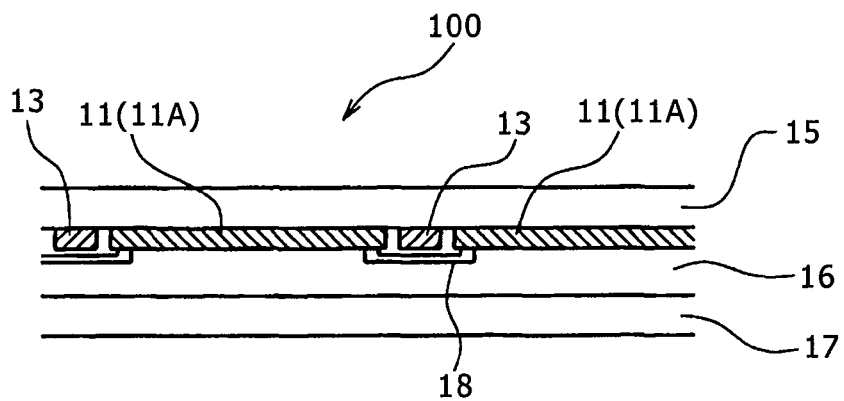
FIG. 3 is a sectional view of a sensor section.

FIG. 3 is a sectional view of the detecting sensor 100, and shows a partial cross section along one transmitting conductor 11. In the detecting sensor 100 of the illustrated embodiment, both of the transmitting conductors 11 and the receiving conductors 13 are formed on one surface of a first glass substrate 15, which serves as a transparent base material in the illustrated embodiment. A second glass substrate 17, which is also a transparent substrate, is additionally disposed over the surfaces of both the transmitting conductors 11 and the receiving conductors 13, with a spacer 16 interposed therebetween. Further, as shown in FIG. 3, the transmitting conductor 11 is divided into a plurality of conductor pieces 11A in a longitudinal direction (i.e., in a direction in which the transmitting conductor 11 extends), which are separated by gaps formed at positions where the receiving conductors 13 are disposed. In addition, a metallic jumper wire 18, which serves as a conductive element, is formed so as to straddle each of the receiving conductors 13. Thus, two conductor pieces 11A adjacent to each other are electrically connected to each other via the metallic jumper wire 18.

The transmitting conductors 11 and the receiving conductors 13 have the shape of a flat plate, and are formed of a transparent electrode film made of an ITO (Indium Tin Oxide) film, for example. In the present embodiment, for example, 64 transmitting conductors 11 are arranged in a vertical direction (Y-direction) at predetermined intervals, and 128 receiving conductors 13 are arranged in a horizontal direction (X-direction) at predetermined intervals. In FIG. 2, $Y_0$ to $Y_{63}$ respectively correspond to the 64 transmitting conductors 11, and $X_0$ to $X_{127}$ respectively correspond to the 128 respective receiving conductors 13.

The spacer 16 is an insulator and is formed of, for example, PVB (PolyVinyl Butyral), EVA (Ethylene Vinyl Acetate), or a silicon rubber. The first and second glass substrates 15 and 17 may be formed, instead, of a sheet-shaped (film-shaped) base material made of a synthetic resin or the like.

The transmitting section 20 shown in FIG. 2 includes a clock generating circuit 21, a multi-frequency signal supplying circuit 22, and a transmitting conductor selecting circuit 23. The clock generating circuit 21 generates a reference signal of a predetermined frequency. The multi-frequency signal supplying circuit 22 generates, for example, 16 kinds of signals of frequencies $f_0, f_1, \ldots,$ and $f_{15}$, respectively, using the reference signal output from the clock generating circuit 21, and outputs these signals in parallel with each other. In FIG. 2, the transmitting conductor selecting circuit 23 is illustrated as being connected to the right end of each transmitting conductor 11. In an exemplary embodiment, however, the transmitting conductor selecting circuit 23 may be connected to both of the right end and the left end of each transmitting conductor 11, so that a signal is input from both ends of each transmitting conductor 11.

FIG. 4 is a diagram showing a detailed configuration of the multi-frequency signal supplying circuit 22. The multi-frequency signal supplying circuit 22 includes 16 signal generating sections 22-0, 22-1, . . . , and 22-15 for generating the 16 kinds of signals of frequencies $f_0, f_1, \ldots,$ and $f_{15}$, respectively.

The signal generating sections 22-0 to 22-15 respectively generate the signals of frequencies $f_0$ to $f_{15}$ based on the reference signal output from the clock generating circuit 21. For example, the signal generating sections 22-0 to 22-15 generate the signals of the predetermined frequencies by frequency-dividing or multiplying the reference signal output from the clock generating circuit 21. Alternatively, the signal generating sections 22-0 to 22-15 may each have a waveform data ROM retaining waveform data of a sine wave, wherein periods of the sine waves retained in different waveform data ROMs are different from each other. The signal generating sections 22-0 to 22-15 may then generate sine wave signals of frequencies $f_0$ to $f_{15}$ by reading out the waveform data in synchronism with the reference signal output from the clock generating circuit 21.

The transmitting conductor selecting circuit 23 selects transmitting conductors 11 as destinations, to which the 16 signals output in parallel with each other from the multi-frequency signal supplying circuit 22 are to be supplied, and sequentially changes (switches) the transmitting conductors 11 as the selected destinations.

Figure 5:
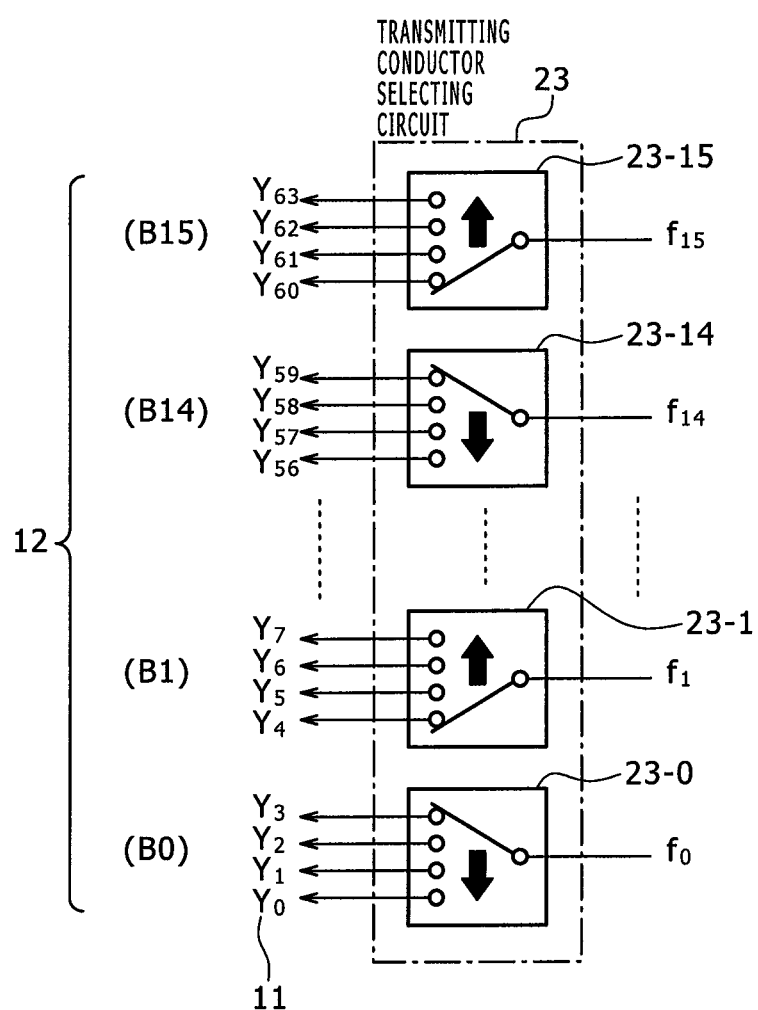
FIG. 5 is a diagram showing a detailed configuration of a transmitting conductor selecting circuit.

FIG. 5 is a diagram showing a detailed configuration of the transmitting conductor selecting circuit 23. The transmitting conductor selecting circuit 23 includes 16 selector switches 23-0, 23-1, ..., and 23-15, to which the 16 kinds of signals of frequencies $f_0$, $f_1$, ..., and $f_{15}$ are input separately from each other. In the present embodiment, the 64 transmitting conductors 11 are divided and grouped (sectioned) into 16 blocks, B0 to B15.

Block B0 includes four transmitting conductors 11 indicated by $Y_0$ to $Y_3$, which are arranged adjacent to each other. The selector switch 23-0 repeatedly changes the destination transmitting conductor 11, to which the signal of frequency $f_0$ output from the signal generating section 22-0 is supplied, in order of $Y_3$, $Y_2$, $Y_1$, and $Y_0$ at predetermined time intervals. In FIG. 5, a direction in which the transmitting conductors 11 are changed is indicated by an arrow inside each of the selector switches 23-0 to 23-15.

Block B1 includes four transmitting conductors 11 indicated by $Y_4$ to $Y_7$, which are arranged adjacent to each other. The selector switch 23-1 repeatedly changes the destination transmitting conductor 11, to which the signal of frequency $f_1$ output from the signal generating section 22-1 is supplied, in order of $Y_4$, $Y_5$, $Y_6$, and $Y_7$ at predetermined time intervals.

The same applies to the other blocks B2 to B15 and the other selector switches 23-2 to 23-15. The selector switches 23-2 to 23-15 each repeatedly changes the destination transmitting conductor 11, to which the signal output from the corresponding signal generating section 22-2 to 22-15 is supplied, in predetermined order and at predetermined time intervals.

The receiving section 30 shown in FIG. 2 includes a receiving conductor selecting circuit 31, an amplifying circuit 32, an analog-to-digital converter circuit (A/D) 33, a signal detecting circuit 34, and a position calculating circuit 35.

Figure 6:
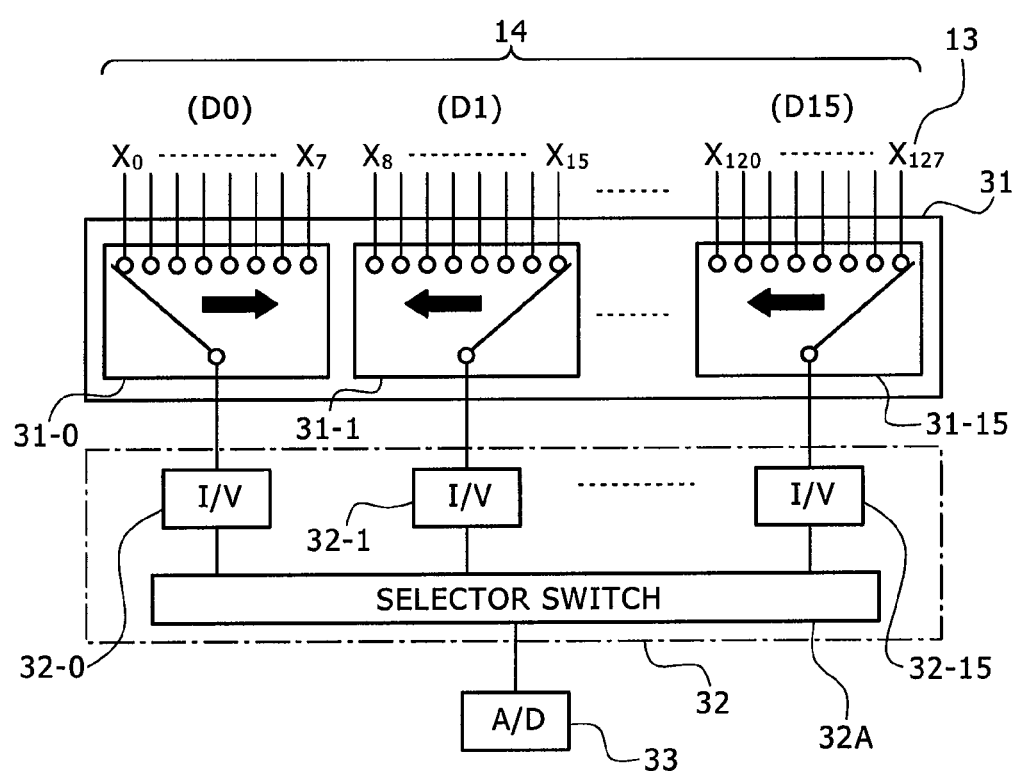
FIG. 6 is a diagram showing a detailed configuration of a receiving conductor selecting circuit and an amplifying circuit.

FIG. 6 is a diagram showing a detailed configuration of the receiving conductor selecting circuit 31 and the amplifying circuit 32. The receiving conductor selecting circuit 31 includes 16 selector switches 31-0, 31-1, ..., and 31-15, each being configured to sequentially select corresponding eight receiving conductors 13. In the present embodiment, the 128 receiving conductors 13 are divided and grouped (sectioned) into 16 blocks, D0 to D15.

Block D0 includes eight receiving conductors 13 indicated by $X_0$ to $X_7$, which are arranged adjacent to each other. The selector switch 31-0 selects one of the eight receiving conductors 13, and repeatedly changes the selection state in order of $X_0$, $X_1$, $X_2$, $X_3$, $X_4$, $X_5$, $X_6$, and $X_7$ at predetermined time intervals. In FIG. 6, a direction in which the receiving conductors 13 are changed (switched) is indicated by an arrow inside each of the selector switches 31-0 to 31-15.

Block D1 includes eight receiving conductors 13 indicated by $X_8$ to $X_{15}$, which are arranged adjacent to each other. The selector switch 31-1 selects one of the eight receiving conductors 13, and repeatedly changes the selection state in order of $X_{15}$, $X_{14}$, $X_{13}$, $X_{12}$, $X_{11}$, $X_{10}$, $X_9$, and $X_8$ at predetermined time intervals.

The same applies to the other blocks D2 to D15 and the other selector switches 31-2 to 31-15. The selector switches 31-2 to 31-15 each selects one of eight receiving conductors 13, which are arranged adjacent to each other and are included in the corresponding block D2 to D15, and repeatedly changes the selection state in predetermined order and at predetermined time intervals.

The amplifying circuit 32 includes 16 current-to-voltage converter circuits (I/V) 32-0, 32-1, ..., and 32-15 and a selector switch 32A. The current-to-voltage converter circuits 32-0 to 32-15 are each in one-to-one correspondence with the selector switches 31-0 to 31-15. Each of the current-to-voltage converter circuits 32-0 to 32-15 amplifies a current I output from a receiving conductor 13 selected by the corresponding selector switch 31-0 to 31-15, respectively, with a predetermined gain, and converts the current I into a voltage V. The selector switch 32A sequentially selects signals (voltages) output from the 16 current-to-voltage converter circuits 32-0 to 32-15, and inputs the selected signals to the analog-to-digital converter circuit 33.

The analog-to-digital converter circuit 33 converts the respective output voltages of the 16 current-to-voltage converter circuits 32-0 to 32-15, which are selected in order by the selector switch 32A, into data comprised of a predetermined number of bits.

The signal detecting circuit 34 shown in FIG. 2 detects signal levels of 16 signal components corresponding to frequencies $f_0$, $f_1$, ..., and $f_{15}$ output from the multi-frequency signal supplying circuit 22 based on the data output from the analog-to-digital converter circuit 33.

Figure 7A:
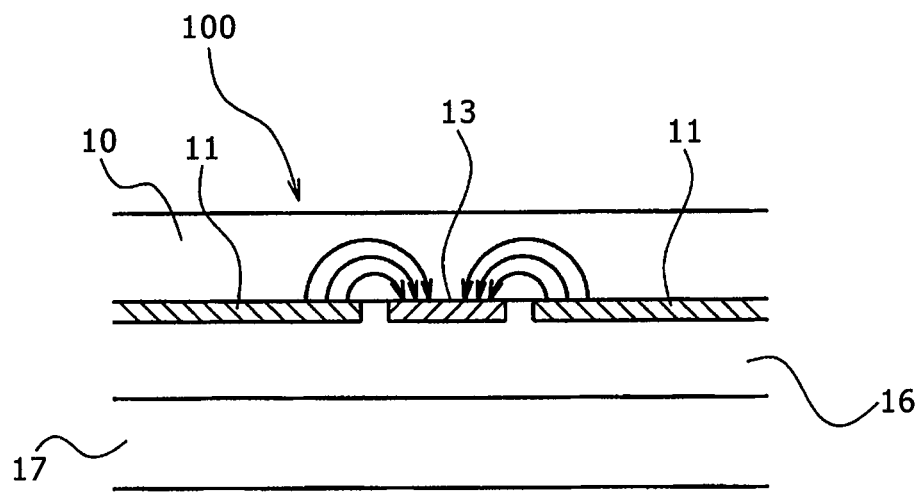
FIGS. 7A and 7B are reference diagrams for illustrating signal levels detected by a signal detecting circuit.
Figure 7B:
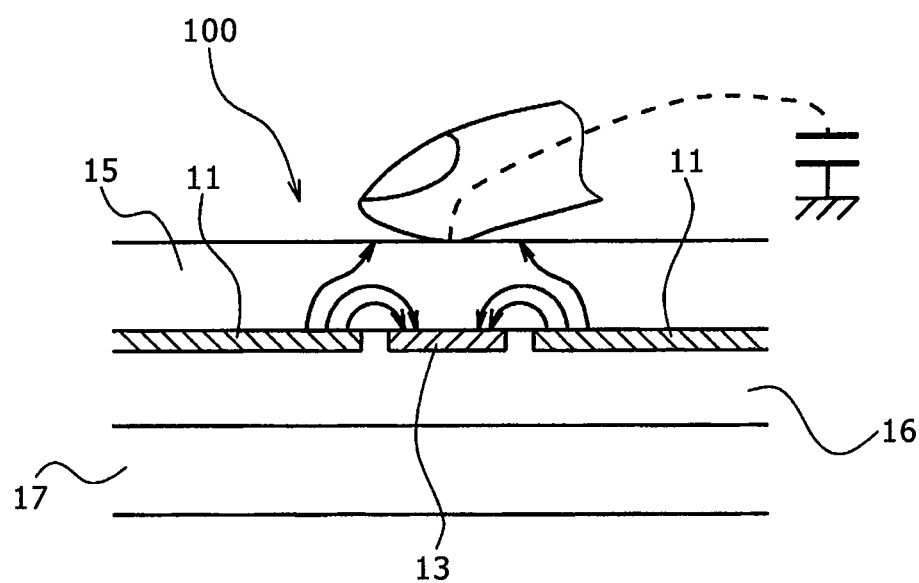

FIGS. 7A and 7B are reference diagrams for illustrating signal levels detected by the signal detecting circuit 34. FIG. 7A shows a state in which a human finger as an indicator is not near a cross point of a transmitting conductor 11 and a receiving conductor 13 (i.e., a position where the transmitting conductor 11 and the receiving conductor 13 intersect each other). FIG. 7B shows a state in which a finger is near the cross point. As shown in FIG. 7A, when the finger is not near the cross point, the transmitting conductor 11 and the receiving conductor 13 are capacitively coupled to each other via the spacer 16 at the cross point, and an electric field emitted from the transmitting conductor 11 converges to the receiving conductor 13. Thus, when a signal of a predetermined frequency (one of frequencies $f_0$ to $f_{15}$) is supplied to the transmitting conductor 11, a current corresponding to the degree of the capacitive coupling can be extracted from the receiving conductor 13, which is capacitively coupled to the transmitting conductor 11. On the other hand, as shown in FIG. 7B, when the finger is near the cross point, while a current can be extracted from the receiving conductor 13 as in the case when the finger is not near the cross point, the degree of capacitive coupling between the transmitting conductor 11 and the receiving conductor 13 differs from that of the case when the finger is not near the cross point. That is, because a portion of an electric field emitted from the transmitting conductor 11 converges to the finger, the degree of capacitive coupling between the transmitting conductor 11 and the receiving conductor 13 is weakened, and the current extracted from the receiving conductor 13 is decreased.

In the present embodiment, 16 transmitting conductors 11 that intersect one receiving conductor 13 are respectively supplied with 16 kinds of signals of frequencies $f_0, f_1, \ldots,$ and $f_{15}$ in parallel with each other. Thus, data corresponding to the receiving conductor 13 includes these 16 kinds of frequency components. The signal detecting circuit 34 extracts these 16 kinds of frequency components separately from each other (for example, it extracts the frequency components by performing synchronous detection), and detects a signal level corresponding to each of the frequency components.

The signal levels detected by the signal detecting circuit 34 are stored, to be associated with the positions of the cross points. For example, combinations of $Y_0$ to $Y_{63}$ identifying the transmitting conductors 11 and $X_0$ to $X_{127}$ identifying the receiving conductors 13 are used as addresses to indicate the positions of cross points, and combinations of the addresses and the signal levels corresponding to the cross points are stored. When 16 kinds of frequency components included in a signal output from one receiving conductor 13 are known, because it is also known to which transmitting conductor 11 within each of the blocks B0 to B15 of the transmitting conductor group 12 a signal is supplied at any given point in time, a specific transmitting conductor 11 can be identified as a destination to which the signal at each frequency is supplied.

When one cycle of the changing operations of the selector switches 23-0 to 23-15 within the transmitting conductor selecting circuit 23 and the changing operations of the selector switches 31-0 to 31-15 within the receiving conductor selecting circuit 31 has been completed, that is, when the signal levels at all of the cross points are detected where the transmitting conductors 11 of the transmitting conductor group 12 and the receiving conductors 13 of the receiving conductor group 14 intersect each other in the detecting sensor 100, the position calculating circuit 35 calculates a cross point, at which a signal level is lowered, as a position where a finger (indicator 300) is near.

Construction of the indicator position detecting device according to one embodiment has been described. Next, details of the detecting sensor 100 will be described.

Figure 8:
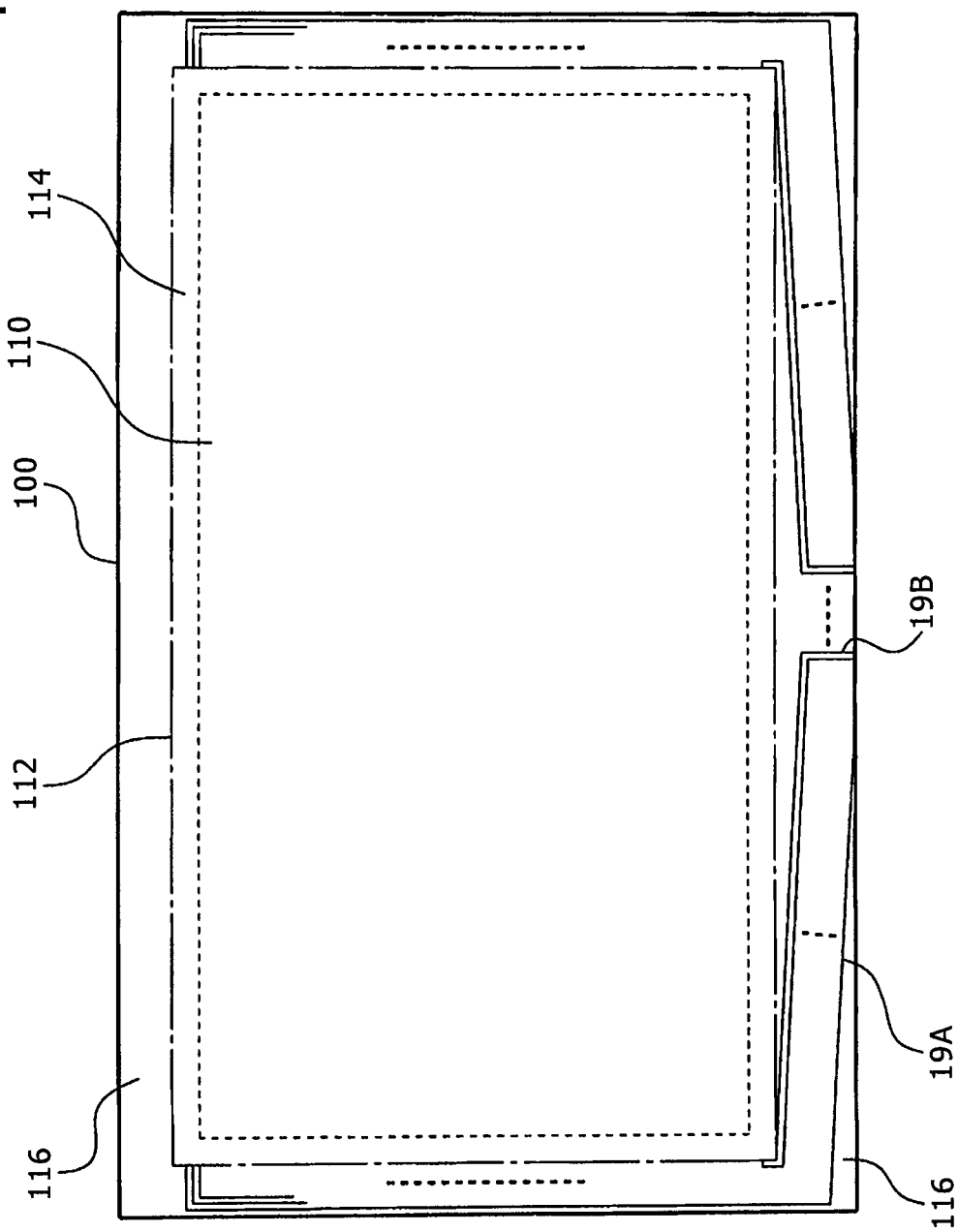
FIG. 8 is a plan view of the sensor section.

FIG. 8 is a plan view of the detecting sensor 100. As shown in FIG. 8, the detecting sensor 100 has a detection region 112, which occupies a large part in the center of the detecting sensor 100, and a wiring region 116 disposed to surround the periphery of the detection region 112. The detection region 112 includes a transmitting region 110, through which the display screen of the display device 200 that the detecting sensor 100 overlaps is visible. The detection region 112 also includes a non-transmitting region 114 having a predetermined width, which is provided on the periphery of the transmitting region 110.

Figure 9:
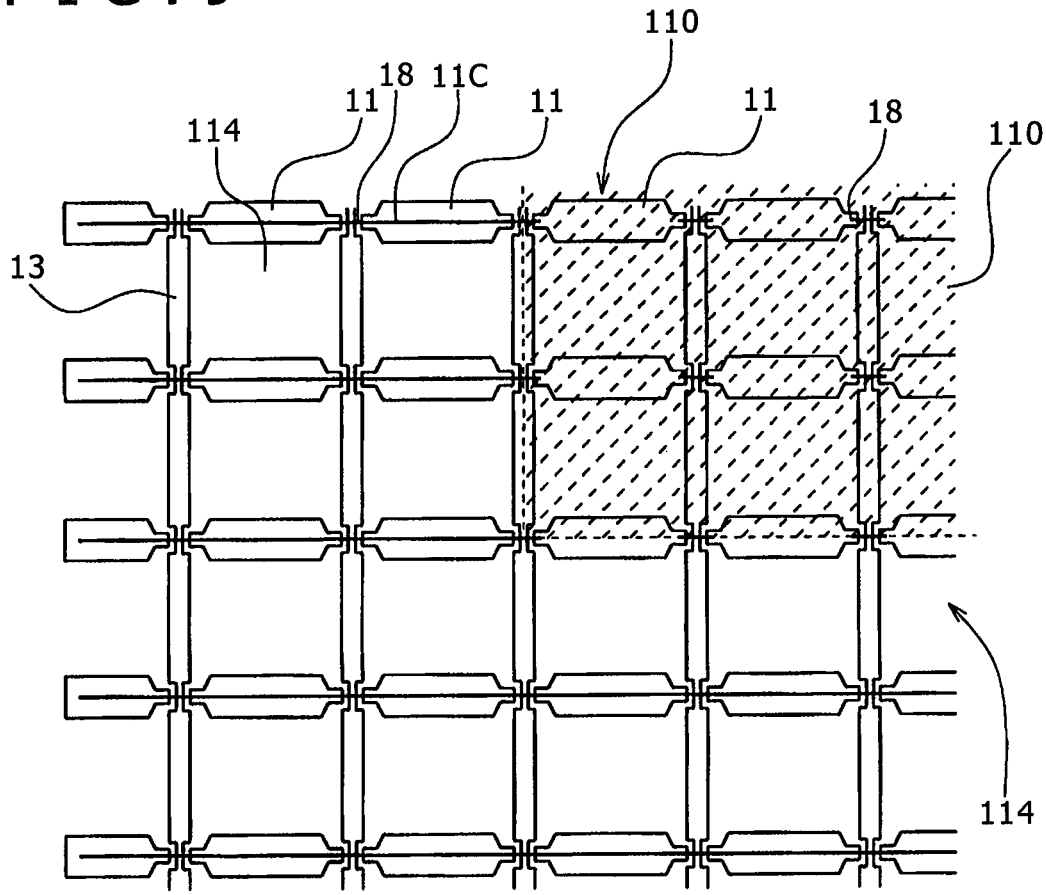
FIG. 9 is a partial enlarged plan view of a detection region.

FIG. 9 is a partial enlarged plan view of the detection region 112, and shows a construction as viewed from an opposite side from a surface to be touched by the indicator 300. As described above, the detection region 112 is set, which is wider by a predetermined width than the transmitting region 110 along its periphery. Thus, the detection region 112 includes both the transmitting region 110 and the non-transmitting region 114, which has a predetermined width and which surrounds the periphery of the transmitting region 110. If the display device 200 has a horizontally long display screen and is disposed at an inclination nearly perpendicular to a ground surface, the plurality of transmitting conductors 11 arranged in parallel with each other extend such that their longitudinal direction is a horizontal direction, and the plurality of receiving conductors 13 arranged in parallel with each other extend such that their longitudinal direction is a vertical direction. Further, the transmitting and receiving conductors 11 and 13 extend over both of the transmitting region 110 and the non-transmitting region 114 of the detection region 112.

Figure 10:
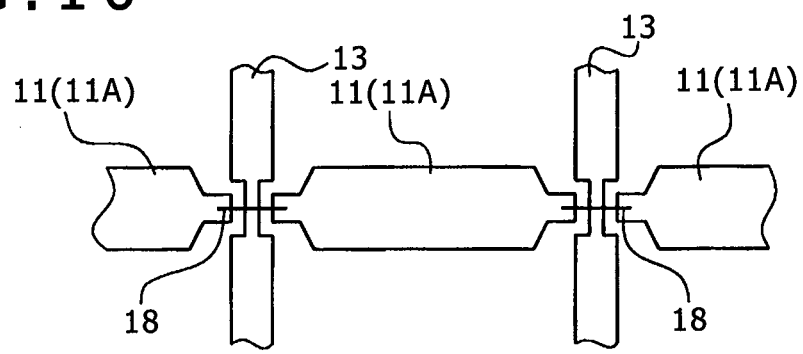
FIG. 10 is a partial enlarged view showing details of one transmitting conductor positioned in a transmitting region and two receiving conductors intersecting the transmitting conductor.

FIG. 10 is a partial enlarged view showing details of one transmitting conductor 11 positioned in the transmitting region 110 and two receiving conductors 13 that intersect the transmitting conductor 11. As shown in FIG. 10, the transmitting conductor 11 extending in the horizontal direction consists of a plurality of conductor pieces 11A, which are separated by gaps formed at the positions where the transmitting conductor 11 intersects the receiving conductors 13. A metallic jumper wire 18 establishes an electrical connection between two conductor pieces 11A, which are adjacent to each other while sandwiching a gap therebetween. Each of the receiving conductors 13 extending in the vertical direction is formed as one continuous conductor, though a portion of the receiving conductor 13 that corresponds to the gap in the transmitting conductor 11 is made narrower than other portions of the receiving conductor 13.

Figure 11:
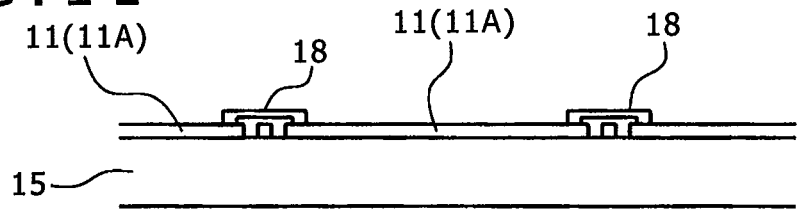
FIG. 11 is a sectional view along the longitudinal direction of the transmitting conductor of FIG. 10, which is positioned in the transmitting region.

FIG. 11 is a sectional view along the longitudinal direction of the transmitting conductor 11, which is positioned in the transmitting region 110, and shows the metallic jumper wire 18 and a structure around the metallic jumper wire 18. As shown in FIG. 11, the metallic jumper wire 18 connects end parts of two conductor pieces 11A that adjoin each other and that sandwich a gap therebetween. The metallic jumper wire 18 is separated from a receiving conductor 13 disposed in the gap, to ensure electric insulation by interposing an insulating material between the metallic jumper wire 18 and the receiving conductor 13.

Figure 12:
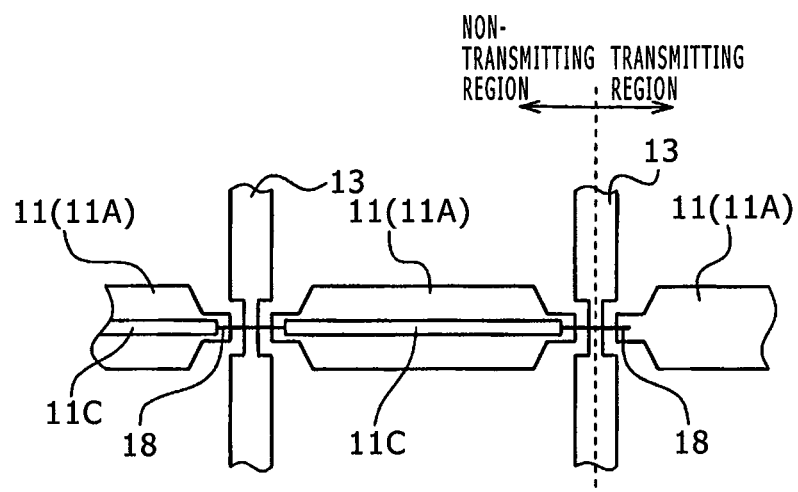
FIG. 12 is a partial enlarged view showing details of one transmitting conductor, which is partially positioned in a non-transmitting region, and two receiving conductors intersecting the transmitting conductor.

FIG. 12 is a partial enlarged view showing details of one transmitting conductor 11, which is partially positioned in the non-transmitting region 114, and two receiving conductors 13 which intersect the transmitting conductor 11. As shown in FIG. 12, in the non-transmitting region 114, the transmitting conductor 11 extending in the horizontal direction includes a plurality of conductor pieces 11A separated by gaps formed at the positions where the transmitting conductor 11 intersects the receiving conductors 13. A metallic jumper wire 18 establishes an electrical connection between two conductor pieces 11A, which are adjacent to each other and which sandwich a gap therebetween. The transmitting conductor 11 positioned in the non-transmitting region 114 further includes a metallic wiring pattern 11C formed integrally with the metallic jumper wire 18 along a longitudinal direction on the surface of each of the conductor pieces 11A. That is, as compared with the construction in the transmitting region 110 shown in FIG. 10, the construction in the non-transmitting region 114 shown in FIG. 12 is different in that the metallic wiring pattern 11C is added, whereas the shape, arrangement and the like of the transmitting conductor 11 (consisting of the conductor pieces 11A) and the receiving conductor 13 themselves are the same. This metallic wiring pattern 11C is formed by directly extending the metallic jumper wire 18 formed at a boundary between the non-transmitting region 114 and the transmitting region 110 into the non-transmitting region 114 along the transmitting conductor 11.

Figure 13:
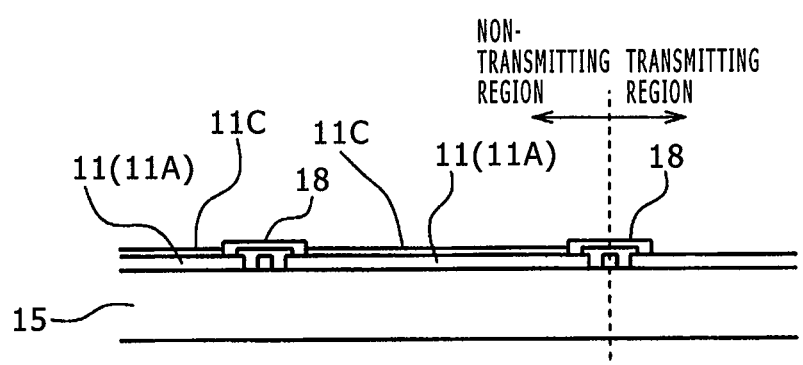
FIG. 13 is a sectional view along the longitudinal direction of the transmitting conductor of FIG. 12, which is partially positioned in the non-transmitting region.

FIG. 13 is a sectional view along the longitudinal direction of the transmitting conductor 11 of FIG. 12, which is partially positioned in the non-transmitting region 114, and shows the metallic jumper wire 18 and the metallic wiring pattern 11C as well as a structure surrounding the metallic jumper wire 18 and the metallic wiring pattern 11C. As shown in FIG. 13, the metallic jumper wire 18 connects end parts of two conductor pieces 11A that adjoin each other and that sandwich a gap therebetween. The metallic jumper wire 18 is separated from a receiving conductor 13 disposed in the gap. The metallic wiring pattern 11C, whose end part is electrically connected to the metallic jumper wire 18, is formed on the surface of the transmitting conductor 11 included in the non-transmitting region 114, without an insulating layer being interposed between the metallic wiring pattern 11C and the transmitting conductor 11.

Figure 14:
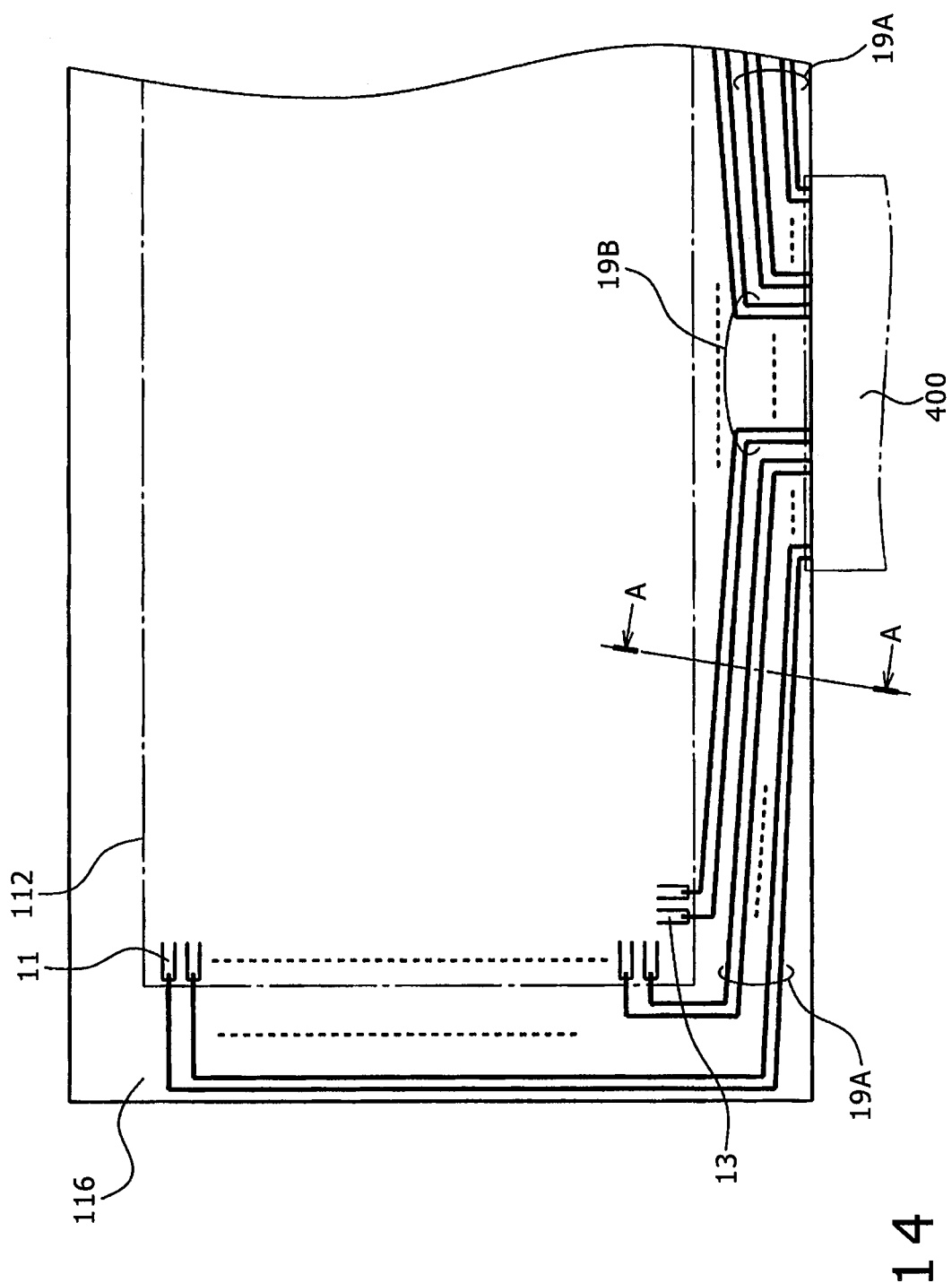
FIG. 14 is a plan view partially detailing a wiring region shown in FIG. 8.

FIG. 14 is a plan view partially detailing the wiring region 116 shown in FIG. 8. As shown in FIG. 14, metallic wiring conductors 19A (i.e., first signal lines) are connected to the left end parts of the transmitting conductors 11. The plurality of metallic wiring conductors 19A corresponding to the respective left end parts of the plurality of transmitting conductors 11 are drawn out to the left side of the detection region 112, thereafter routed in a downward direction along the left side of the detection region 112, and further routed along the lower side of the detection region 112 to the vicinity of the central part of the lower side of the detection region 112. Though not shown, the metallic wiring conductors 19A, which form a first wiring pattern, are also connected to the right end parts of the transmitting conductors 11, and are routed in a similar manner. Specifically, the plurality of metallic wiring conductors 19A corresponding to the respective right end parts of the plurality of transmitting conductors 11 are drawn out to the right side of the detection region 112, thereafter routed in a downward direction along the right side of the detection region 112, and further routed along the lower side of the detection region 112 to the vicinity of the central part of the lower side of the detection region 112.

In addition, metallic wiring conductors 19B (i.e., second signal lines) are connected to the lower end parts of the receiving conductors 13. The plurality of metallic wiring conductors 19B corresponding to the respective lower end parts of the plurality of receiving conductors 13 are drawn out to the lower side of the detection region 112, and thereafter routed along the lower side of the detection region 112 to the central part of the lower side of the detection region 112. The end parts of the metallic wiring conductors 19A and 19B thus routed to the central part of the lower side of the detection region 112 are connected to a flexible board 400, on which the transmitting section 20, the receiving section 30, the control circuit 40 and the like, as shown in FIG. 2, are mounted. This connection may be made with an anisotropic conductive film (ACF), for example.

In the present embodiment, a ground layer connected to a predetermined potential (for example, to ground) is formed in a region within the wiring region 116 where the metallic wiring conductors 19A that form the first wiring pattern and the metallic wiring conductors 19B that form the second wiring pattern are adjacent and close to each other (i.e., along the lower side of the detection region 112 in the illustrated embodiment). As the position where the ground layer may be formed, the following four cases (1) to (4) may be considered, for example. By the way, it should be noted that the predetermined potential may be a fixed potential other than a ground potential.

Case (1) The ground layer may be formed between the metallic wiring conductors 19A corresponding to the transmitting conductors 11 and a position indicated by the indicator 300 (i.e., between the metallic wiring conductors 19A and the first glass substrate 15 when the indicator 300 is to indicate a position from the side of the first glass substrate 15, as shown in FIG. 3).

Case (2) The ground layer may be formed between the metallic wiring conductors 19B corresponding to the receiving conductors 13 and a position indicated by the indicator 300.

Case (3) The ground layer may be formed between both of the metallic wiring conductors 19A corresponding to the transmitting conductors 11 and the metallic wiring conductors 19B corresponding to the receiving conductors 13 and a position indicated by the indicator 300.

Case (4) The ground layer may be formed between the metallic wiring conductors 19A corresponding to the transmitting conductors 11 and the metallic wiring conductors 19B corresponding to the receiving conductors 13.

Figure 15:
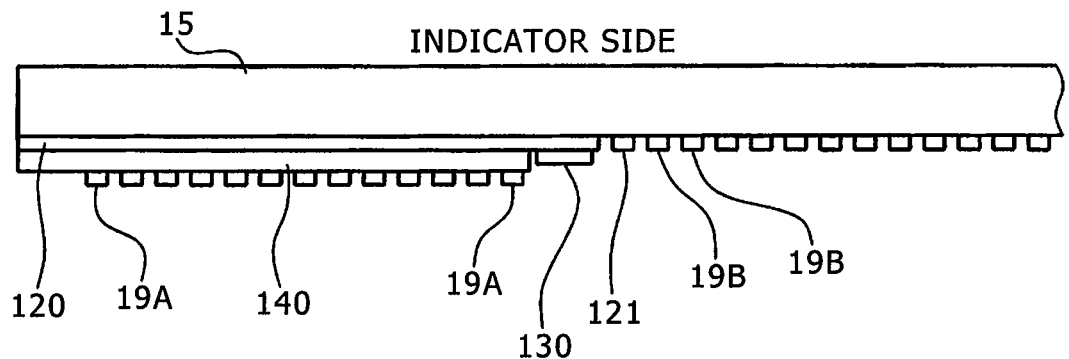
FIG. 15 is a sectional view taken along line A-A of FIG. 14, in a case where a ground layer is formed between metallic wiring conductors corresponding to transmitting conductors 11 and a first glass substrate.

FIG. 15 is a sectional view taken along line A-A of FIG. 14, in the case where the ground layer is formed between the metallic wiring conductors 19A corresponding to the transmitting conductors 11 and the first glass substrate 15. That is, FIG. 15 corresponds to case (1) described above. As shown in FIG. 15, a ground layer 120 (i.e., a first conductive pattern) and an insulating layer 140 (i.e., an insulating material) are formed between the metallic wiring conductors 19A and the first glass substrate 15. The metallic wiring conductors 19A are arranged on the ground layer 120, with the insulating layer 140 interposed between the metallic wiring conductors 19A and the ground layer 120.

The ground layer 120 may be formed of the same material as that of the transmitting conductors 11 and the receiving conductors 13 (for example, a transparent electrode film made of an ITO film). In a process of forming the transmitting conductors 11 and the receiving conductors 13, the ground layer 120 may be formed at the same time. A terminal electrode 130, which forms a longitudinal second conductive pattern in the illustrated embodiment, is arranged along the extending direction of both of the transmitting conductors 11 and the receiving conductors 13, in the vicinity of an edge part of the ground layer 120 toward the side of the receiving conductors 13, as shown. The ground layer 120 is grounded via the terminal electrode 130.

As shown in FIG. 15, a ground layer 121, which also forms a longitudinal second conductive pattern, is arranged in parallel with the ground layer 120 between the transmitting conductors 11 and the receiving conductors 13. The ground layer 121 has a longitudinal shape along the extending direction of the receiving conductors 13, and is grounded similarly to the ground layer 120. Because the ground layer 120 corresponding to the transmitting conductors 11 is formed separately from the ground layer 121, which is adjacent to the receiving conductors 13, variations in potential are prevented from propagating between the ground layers 120 and 121. Also, because the ground layer 121 does not overlap the metallic wiring conductors 19A nor the metallic wiring conductors 19B, the ground layer 121 can be formed at the same time when the metallic wiring conductors 19A and the metallic wiring conductors 19B are formed using the same metallic conductor material. In the illustrated embodiment, the terminal electrode 130 corresponds to a first linear conductor, and the ground layer 121 corresponds to a second linear conductor, which together form the second conductor pattern.

As shown in FIG. 15, the terminal electrode 130 is set to have a width that is wider as compared to that of the ground layer 121, both of which lie between the transmitting conductors 11 and the receiving conductors 13. A comparison between the strength of signals input to and output from the transmitting conductors 11 and the strength of signals input to and output from the receiving conductors 13 shows that the strength of the signals input to and output from the transmitting conductors 11 is higher. By making the terminal electrode 130 on the side of the transmitting conductors 11 wider, it becomes possible to effectively block an electric field created by the transmitting conductors 11, which have the high signal strength, with the wide terminal electrode 130.

Figure 16:
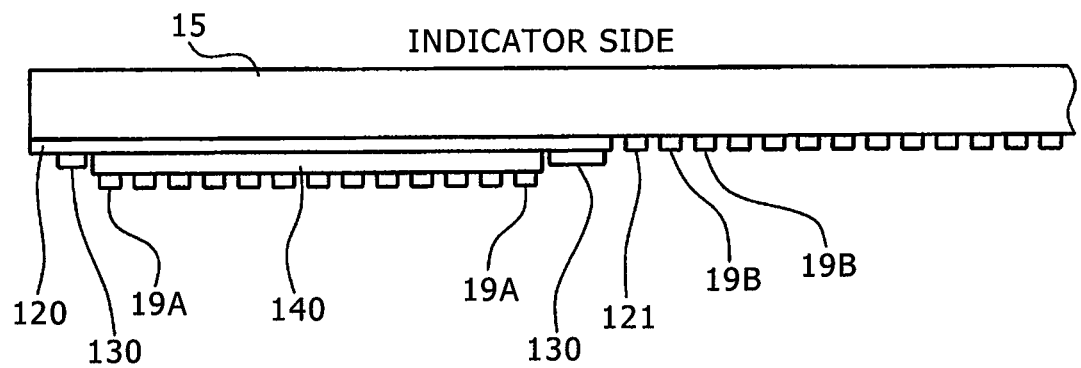
FIG. 16 is a diagram showing sample modification to the construction of FIG. 15.

FIG. 16 is a diagram showing a sample modification made to the construction of FIG. 15. In the construction of FIG. 15, the ground layer 120 disposed between the transmitting conductors 11 and the first glass substrate 15 extends (or is exposed) toward the side of the receiving conductors 13, and the terminal electrode 130 is disposed on the extended (exposed) part of the ground layer 120. On the other hand, in the modified example of FIG. 16, the ground layer 120 is extended (exposed) not only toward the side of the receiving conductors 13 but also toward an opposite side from the receiving conductors 13, and the terminal electrodes 130 are disposed on both of the extended (exposed) parts of the ground layer 120, respectively. Thus, variations in potential of the ground layer 120 as a whole can be further suppressed.

Figure 17:
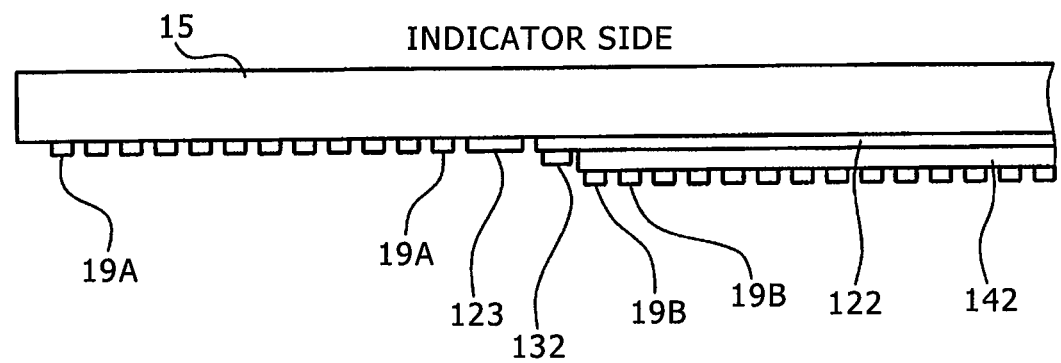
FIG. 17 is a sectional view taken along line A-A of FIG. 14, in a case where a ground layer is formed between metallic wiring conductors corresponding to receiving conductors and the first glass substrate.

FIG. 17 is a sectional view taken along line A-A of FIG. 14, in the case where the ground layer is formed between the metallic wiring conductors 19B corresponding to the receiving conductors 13 and the first glass substrate 15. That is, FIG. 17 corresponds to case (2) described above. As shown in FIG. 17, a ground layer 122 and an insulating layer 142 are formed between the metallic wiring conductors 19B and the first glass substrate 15. The metallic wiring conductors 19B are arranged on the ground layer 122, with the insulating layer 142 interposed between the metallic wiring conductors 19B and the ground layer 122.

The ground layer 122 may be formed of the same material as that of the transmitting conductors 11 and the receiving conductors 13 (for example, a transparent electrode film made of an ITO film). Thus, in a process of forming the transmitting conductors 11 and the receiving conductors 13, the ground layer 122 may be formed at the same time. A longitudinal terminal electrode 132 is formed along the extending direction of both of the transmitting conductors 11 and the receiving conductors 13, in the vicinity of an edge part of the ground layer 122 toward the side of the transmitting conductors 11. The ground layer 122 is grounded via the terminal electrode 132.

As shown in FIG. 17, a ground layer 123 is formed in parallel with the ground layer 122 between the transmitting conductors 11 and the receiving conductors 13. The ground layer 123 has a longitudinal shape along the extending direction of the transmitting conductors 11, and is grounded similarly to the ground layer 122. Because the ground layer 122 corresponding to the receiving conductors 13 is formed separately from the ground layer 123 adjacent to the transmitting conductors 11, variations in potential are prevented from propagating between the ground layers 122 and 123. Also, because the ground layer 123 does not overlap the metallic wiring conductors 19A nor the metallic wiring conductors 19B, the ground layer 123 can be formed by using the same metallic conductor material and at the same time when the metallic wiring conductors 19A and the metallic wiring conductors 19B are formed.

In the construction shown in FIG. 17, the ground layer 122 disposed between the receiving conductors 13 and the first glass substrate 15 is extended (exposed) toward the side of the transmitting conductors 11, and the terminal electrode 132 is disposed on the exposed part of the ground layer 122. However, the ground layer 122 may be extended (exposed) not only toward the side of the transmitting conductors 11 but also toward an opposite side from the transmitting conductors 11, and the terminal electrodes 132 may be disposed on both of the exposed parts of the ground layer 122. Then, variations in potential of the ground layer 122 as a whole can be further suppressed.

Figure 18:
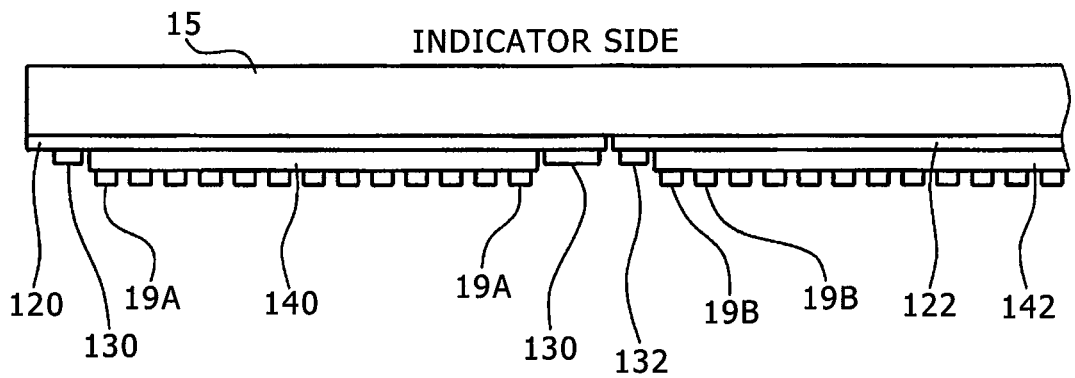
FIG. 18 is a sectional view taken along line A-A of FIG. 14, in a case where a ground layer is formed between both of the metallic wiring conductors corresponding to the transmitting conductors and the metallic wiring conductors corresponding to the receiving conductors and the first glass substrate.

FIG. 18 is a sectional view taken along line A-A of FIG. 14, in the case where the ground layer is formed between both of the metallic wiring conductors 19A corresponding to the transmitting conductors 11 and the metallic wiring conductors 19B corresponding to the receiving conductors 13 and the first glass substrate 15. That is, FIG. 18 corresponds to case (3) described above. As shown in FIG. 18, a ground layer 120 and an insulating layer 140 are formed between the metallic wiring conductors 19A and the first glass substrate 15, and a ground layer 122 and an insulating layer 142 are formed between the metallic wiring conductors 19B and the first glass substrate 15. The metallic wiring conductors 19A are arranged on the ground layer 120, with the insulating layer 140 interposed between the metallic wiring conductors 19A and the ground layer 120. Similarly, the metallic wiring conductors 19B are arranged on the ground layer 122, with the insulating layer 142 interposed between the metallic wiring conductors 19B and the ground layer 122.

The ground layers 120 and 122 may be formed of the same material as that of the transmitting conductors 11 and the receiving conductors 13 (for example, a transparent electrode film made of an ITO film). Thus, in a process of forming the transmitting conductors 11 and the receiving conductors 13, the ground layers 120 and 122 may be also formed at the same time. A longitudinal terminal electrode 130 may be formed along the extending direction of the transmitting conductors 11 and the receiving conductors 13 in the vicinity of an edge part of the ground layer 120 toward the side of the receiving conductors 13. The ground layer 120 is grounded via the terminal electrode 130. Another longitudinal terminal electrode 132 may be formed along the extending direction of the transmitting conductors 11 and the receiving conductors 13 in the vicinity of an edge part of the ground layer 122 toward the side of the transmitting conductors 11. The ground layer 122 is grounded via the terminal electrode 132. Separating the ground layer 120 from the ground layer 122 in this manner prevents propagation of variations in potential between the ground layers 120 and 122.

A comparison between the terminal electrode 130 and the terminal electrode 132 formed between the transmitting conductors 11 and the receiving conductors 13, in the example shown in FIG. 18, shows that the terminal electrode 130 is set wider. A comparison between the strength of signals input to and output from the transmitting conductors 11 and the strength of signals input to and output from the receiving conductors 13 shows that the strength of the signals input to and output from the transmitting conductors 11 is higher. Setting the terminal electrode 130 on the side of the transmitting conductors 11 wider permits effectively blocking an electric field created by the transmitting conductors 11, which have the high signal strength, with the wide terminal electrode 130.

Figure 19:
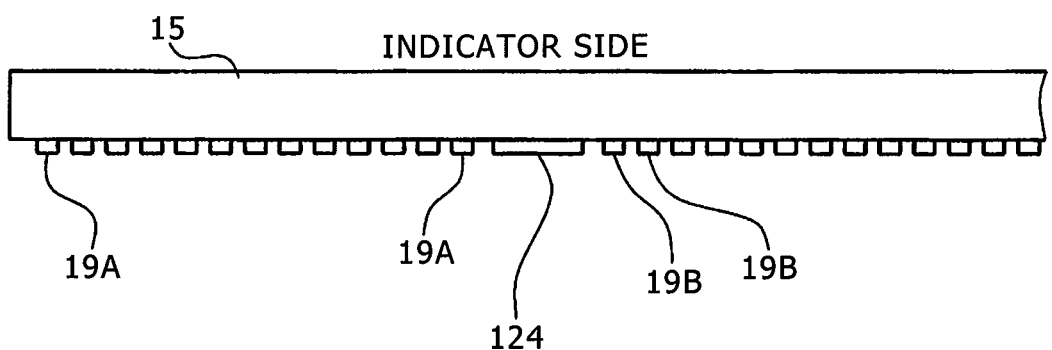
FIG. 19 is a sectional view taken along line A-A of FIG. 14, in a case where a ground layer is formed between the metallic wiring conductors corresponding to the transmitting conductors and the metallic wiring conductors corresponding to the receiving conductors.

FIG. 19 is a sectional view taken along line A-A of FIG. 14, in the case where the ground layer is formed between the metallic wiring conductors 19A corresponding to the transmitting conductors 11 and the metallic wiring conductors 19B corresponding to the receiving conductors 13. That is, FIG. 19 corresponds to case (4) described above. As shown in FIG. 19, the metallic wiring conductors 19A and the metallic wiring conductors 19B are both formed on the first glass substrate 15, and a ground layer 124 is disposed between the metallic wiring conductors 19A and the metallic wiring conductors 19B, with a predetermined gap between the metallic wiring conductors 19A and the ground layer 124 and a predetermined gap between the metallic wiring conductors 19B and the ground layer 124. The ground layer 124 has a longitudinal shape so as to separate the transmitting conductors 11 and the receiving conductors 13 from each other in parallel with the extending direction of the transmitting conductors 11 and the receiving conductors 13. The ground layer 124 is grounded similarly to the ground layer 120, described above. Because the ground layer 124 is disposed between the metallic wiring conductors 19A and 19B, interference of signals between the metallic wiring conductors 19A and 19B can be reduced.

Figure 20:
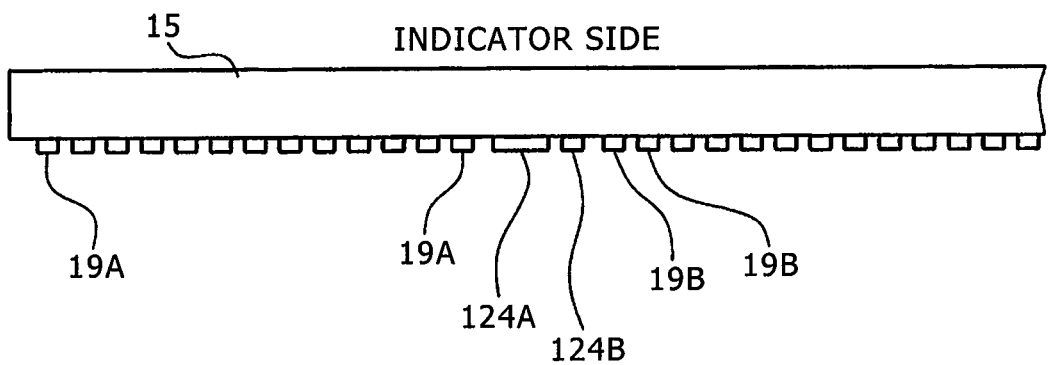
FIG. 20 is a diagram showing sample modification to the construction of FIG. 19.

FIG. 20 is a diagram showing a sample modification to the construction shown in FIG. 19. While one ground layer 124 is formed between the metallic wiring conductors 19A and 19B in the construction of FIG. 19, the ground layer 124 may be divided into two parts, that is, separated into a ground layer 124A adjacent to the metallic wiring conductors 19A and a ground layer 124B adjacent to the metallic wiring conductors 19B. This allows for further preventing variations in potential of the metallic wiring conductors 19A corresponding to the transmitting conductors 11 from propagating toward the side of the receiving conductors 13 via the ground layer 124A.

Thus, in the detecting sensor 100 according to various exemplary embodiments, even in the case where the metallic wiring conductors 19A and the metallic wiring conductors 19B are arranged adjacent to each other in the wiring region on the first glass substrate 15, because the ground layer 120 set to a predetermined potential is formed to overlap the metallic wiring conductors 19A, even when an indicator approaches the region where the metallic wiring conductors 19A and the metallic wiring conductors 19B are adjacent to each other, interference of signals between the metallic wiring conductors 19A and the metallic wiring conductors 19B can be reduced, and erroneous detection of the indicator can be prevented.

In addition, the insulating layer 140 for electrically insulating the metallic wiring conductors 19A from the ground layer 120 may be disposed between the metallic wiring conductors 19A and the ground layer 120, and the insulating layer 140 may be formed of the same insulating material used to provide electric insulation between the conductor pieces 11A of the transmitting conductors 11 and the receiving conductors 13. Thus, these insulating layer and materials can be formed simultaneously, to simplify the manufacturing process to thereby reduce manufacturing cost. In addition, forming the transmitting conductors 11 and the receiving conductors 13 as a single layer ensures their stable characteristics, while further simplifying the manufacturing process to thereby reduce manufacturing cost.

In addition, when the same material is used to form the metallic jumper wires 18 that connect the conductor pieces 11A of the transmitting conductors 11 to each other, the metallic wiring conductors 19A, and the metallic wiring conductors 19B (or either of the metallic wiring conductors 19A or the metallic wiring conductors 19B), the metallic jumper wires 18 and the metallic wiring conductors 19A and 19B can be formed simultaneously, and the manufacturing process may be further simplified to thereby reduce manufacturing cost.

In addition, the metallic wiring conductors 19A and the metallic wiring conductors 19B may have higher conductivity than the transmitting conductors 11 and the receiving conductors 13, to therefore improve signal transmission characteristics by lowering the overall resistance of the transmitting conductors 11 and the metallic wiring conductors 19A and the overall resistance of the receiving conductors 13 and the metallic wiring conductors 19B.

In addition, when the terminal electrode 130 and the ground layer 121, which are set to a predetermined potential, are disposed between the metallic wiring conductors 19A and the metallic wiring conductors 19B, interference of signals in the region where the metallic wiring conductors 19A adjoin the metallic wiring conductors 19B can be reduced, and erroneous detection of an indicator can be prevented.

Next, a concrete example of a process of manufacturing the detecting sensor 100 is described. FIGS. 21A to 21F are diagrams representing a process of manufacturing the detecting sensor 100 shown in FIG. 15.

Figure 21A:
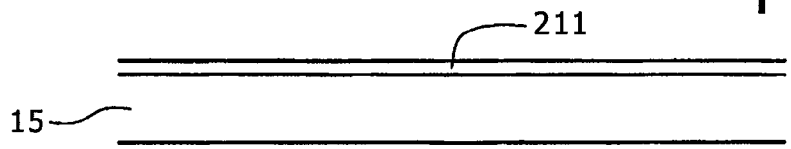
FIGS. 21A, 21B, 21C, 21D, 21E, and 21F are diagrams representing a process of manufacturing a detecting sensor having the construction shown in FIG. 15.

(1) An ITO film 211 as a conductive film having transparency is formed on one surface of a first glass substrate 15, which is a transparent substrate that overlaps a display screen (first step, FIG. 21A).

Figure 21B:
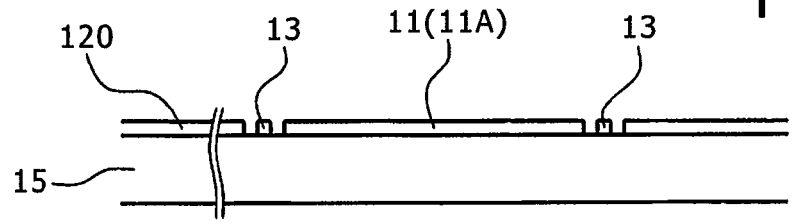

(2) The ITO film 211 is processed (for example, by photolithography and etching), to thereby form receiving conductors 13, conductor pieces 11A, and a ground layer 120 as a conductive pattern, out of the ITO film 211 on one surface of the first glass substrate 15 (second step, FIG. 21B). At this time, the receiving conductors 13 are formed in the shape of continuous lines, while the conductor pieces 11A are formed in the shape of dotted lines, which are broken at positions that intersect the receiving conductors 13.

Figure 21C:
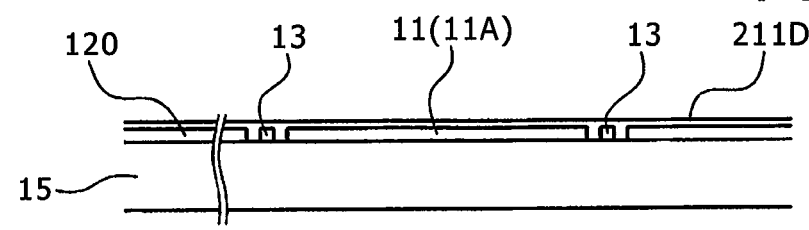

(3) An insulating layer 211D (i.e., an insulating material) is formed on one surface of the first glass substrate 15, on which the conductor pieces 11A, the receiving conductors 13, and the ground layer 120 have been formed, using a coater (third step, FIG. 21C).

Figure 21D:
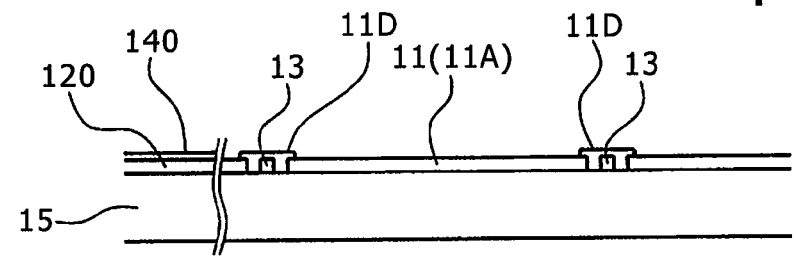

(4) The insulating layer 211D is processed (for example, by photolithography and etching) to remove unnecessary portions of the insulating layer 211D, to thereby leave the insulating layer 211D in regions where the conductor pieces 11A intersect the receiving conductors 13 (i.e., regions between the conductor pieces 11A where the receiving conductors 13 are disposed) and in an area for the ground layer 120 (fourth step, FIG. 21D). Thus, an insulating layer 11D is formed in the regions where the conductor pieces 11A intersect the receiving conductors 13, and an insulating layer 140 is formed over the ground layer 120.

Figure 21E:
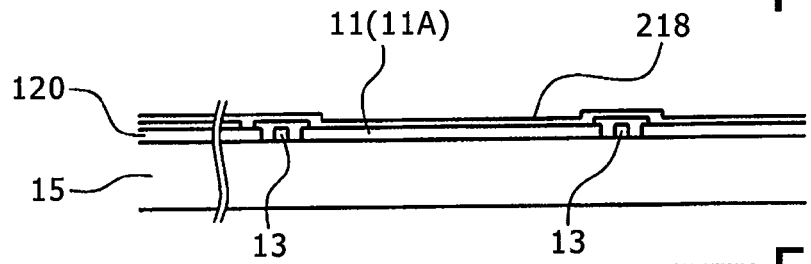

(5) A metallic layer 218, formed of a metallic film having higher conductivity than the conductor pieces 11A, the receiving conductors 13, and the ground layer 120, is formed by applying a metallic film forming process (for example, by sputtering a metal) over one surface of the first glass substrate 15, on which the conductor pieces 11A, the receiving conductors 13, and the ground layer 120 have been formed (fifth step, FIG. 21E).

Figure 21F:
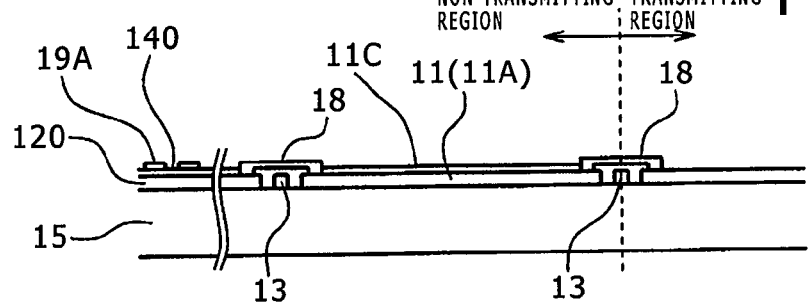

(6) The metallic layer 218 is processed (for example, by photolithography and etching) to simultaneously form metallic jumper wires 18, which respectively establish electric connections between two adjacent conductor pieces 11A along the longitudinal direction of the conductor pieces 11A, metallic wiring conductors 19A over the insulating layer 140, a terminal electrode 130 (not shown in FIGS. 21A to 21F) on the ground layer 120, and metallic wiring conductors 19B (not shown in FIGS. 21A to 21F) over the first glass substrate 15 (sixth step, FIG. 21F). Thereafter, an overcoat material is applied, to thereby complete the detecting sensor 100.

In the detecting sensor 100 manufactured in this manner, even if the two kinds of metallic wiring conductors 19A and 19B are arranged adjacent to each other in the wiring region 116, the ground layer 120 or the like is formed to overlap the metallic wiring conductors 19A or 19B and, therefore, even when an indicator 300 approaches the wiring region 116, interference of signals between the metallic wiring conductors 19A and the metallic wiring conductors 19B can be reduced, and erroneous detection of the indicator can be prevented. In addition, the transmitting conductors 11, the receiving conductors 13, and the ground layer 120 or the like can all be formed of a transparent conductor material as a single layer. Thus, it is possible to achieve stable characteristics of the two kinds of conductors (the transmitting conductors 11 and the receiving conductors 13), and it becomes unnecessary to perform extra processing to add the ground layer 120 or the like. Thus, high performance is achieved while at the same time manufacturing cost is suppressed. While the manufacturing process represented in FIGS. 21A to 21F corresponds to the construction shown in FIG. 15, the process similarly applies to the construction shown in FIG. 16, FIG. 17, and FIG. 18.

FIGS. 22A to 22F are diagrams representing a process of manufacturing the detecting sensor 100 shown in FIG. 19.

Figure 22A:
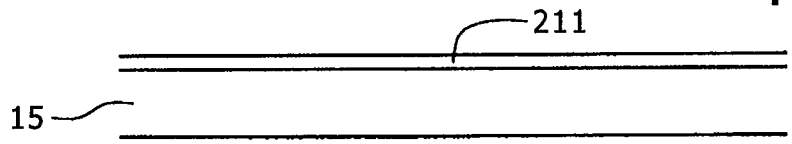
FIGS. 22A, 22B, 22C, 22D, 22E, and 22F are diagrams representing a process of manufacturing a detecting sensor having the construction shown in FIG. 19.

(1) An ITO film 211 as a conductive film having transparency is formed on one surface of a first glass substrate 15, which is a transparent substrate that overlaps a display screen (first step, FIG. 22A).

Figure 22B:
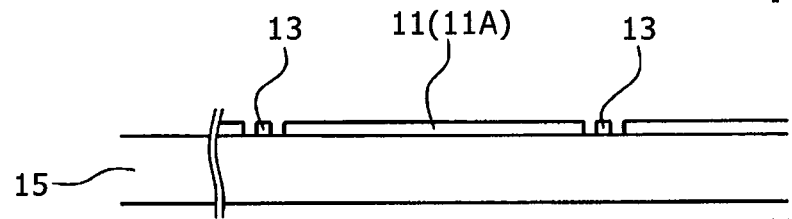

(2) The ITO film 211 is processed (for example, by photolithography and etching), to thereby form receiving conductors 13 and conductor pieces 11A out of the ITO film 211 on one surface of the first glass substrate 15 (second step, FIG. 22B). At this time, the receiving conductors 13 are formed in the shape of continuous lines, while the conductor pieces 11A are formed in the shape of dotted lines, which are broken at positions that intersect the receiving conductors 13.

Figure 22C:
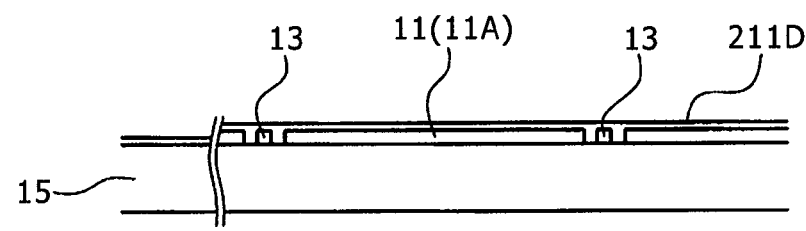

(3) An insulating layer 211D (i.e., an insulating material) is formed on one surface of the first glass substrate 15, on which the conductor pieces 11A and the receiving conductors 13 have been formed, using a coater (third step, FIG. 22C).

Figure 22D:
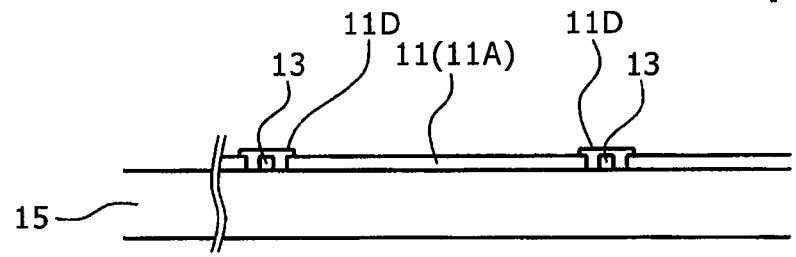

(4) The insulating layer 211D is processed (for example, by photolithography and etching) to remove unnecessary portions of the insulating layer 211D, to thereby leave the insulating layer 211D in regions where the conductor pieces 11A intersect the receiving conductors 13 (i.e., regions between the conductor pieces 11A where the receiving conductors 13 are disposed) (fourth step, FIG. 22D). Thus, an insulating layer 11D is formed in the regions where the conductor pieces 11A intersect the receiving conductors 13.

Figure 22E:
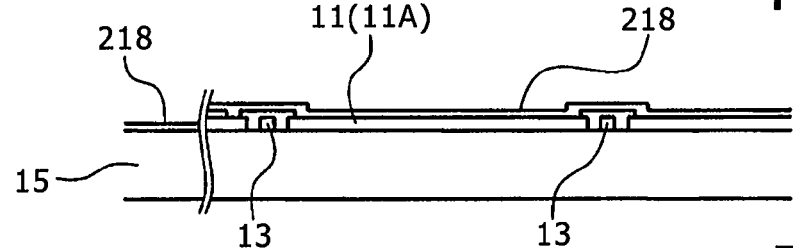

(5) A metallic layer 218, formed of a metallic film having higher conductivity than the conductor pieces 11A and the receiving conductors 13, is formed by applying a metallic film forming process (for example, by sputtering a metal) over one surface of the first glass substrate 15, on which the conductor pieces 11A and the receiving conductors 13 have been formed (fifth step, FIG. 22E).

Figure 22F:
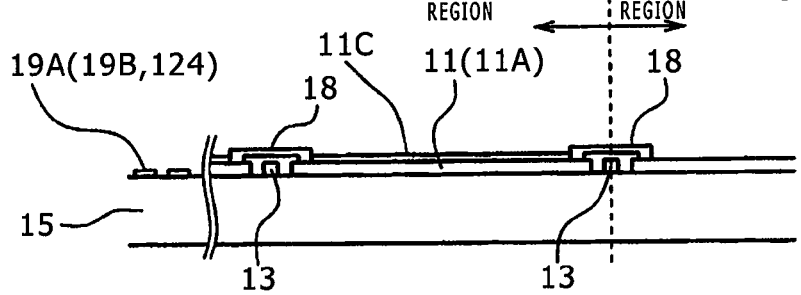

(6) The metallic layer 218 is processed (for example, by photolithography and etching) to simultaneously form metallic jumper wires 18, which respectively establish electric connections between two adjacent conductor pieces 11A along the longitudinal direction of the conductor pieces 11A, and metallic wiring conductors 19A and 19B and a ground layer 124 over the first glass substrate 15 (sixth step, FIG. 22F). Thereafter, an overcoat material is applied, to thereby complete the detecting sensor 100.

In the detecting sensor 100 manufactured in this manner, even if the two kinds of metallic wiring conductors 19A and 19B are arranged adjacent to each other in the wiring region 116, the ground layer 124 is formed between the metallic wiring conductors 19A and 19B and, therefore, even when an indicator 300 approaches the wiring region 116, interference of signals between the metallic wiring conductors 19A and the metallic wiring conductors 19B can be reduced, and erroneous detection of the indicator can be prevented. While the manufacturing process represented in FIGS. 22A to 22F corresponds to the construction shown in FIG. 19, the process similarly applies to the construction shown in FIG. 20.

Those skilled in the art should appreciate that the present invention is not limited to the embodiments described above, and various modifications are possible and are within the scope of the present invention. For example, while the transmitting conductors 11 are illustrated to be orthogonal to the receiving conductors 13 in each of the foregoing embodiments, the present invention is also applicable in cases where the transmitting conductors 11 intersect the receiving conductors 13 at an angle other than 90 degrees.

In addition, while each of the transmitting conductor group 12 and the receiving conductor group 14 is segmented (grouped) into 15 blocks in each of the foregoing embodiments, the number of blocks may vary, and also the number of blocks of the transmitting conductor group 12 may be different from the number of blocks of the receiving conductor group 14. Also, circuitry may be provided to detect a current in each of the receiving conductors 13 included in the receiving conductor group 14, to thereby omit having to perform the changing (switching) operation over the receiving conductors 13.

In each of the above-described embodiments, multi-frequency signals are assumed as signals to be supplied to the transmitting conductors 11. However, the signals to be supplied may be signals other than multi-frequency signals. For example, similar effects can be obtained in an indicator position detecting device, in which a plurality of spread code signals, or spread spectrum codes, are supplied to the transmitting conductors 11, which are divided into each block. Furthermore, similar effects can be also obtained in an indicator position detecting device, in which a specific spread code is used and shifted in phase, such that a plurality of phase-shifted codes (based on the same spread code) are supplied to the transmitting conductors 11, which are divided into each block.

In each of the above-described embodiments, the present invention is applied in a detecting sensor 100 of the capacitance type, and in an indicator position detecting device, which supplies signals to the transmitting conductors 11 and which detects current output from the receiving conductors 13. However, the present invention is also applicable in an indicator position detecting device of the capacitance type, which detects respective capacitance values of two kinds of conductors (electrodes) intersecting each other to thereby detect the position of an indicator, as disclosed in Japanese Patent Laid-Open No. 2009-162538, for example. Furthermore, the present invention is applicable in detecting sensors and indicator position detecting devices, which use systems other than the capacitance system, as long as the detecting sensors and the indicator position detecting devices are capable of sequentially selecting conductors.

In the foregoing embodiments, the transmitting conductors, the receiving conductors, the ground layer, and the like, are formed by using an ITO film as a conductive film having transparency. However, a conductive film having transparency other than an ITO film may be used. Also, when a focus is to reduce signal interference when an indicator approaches a region in which two kinds of signal lines (metallic wiring conductors) are arranged adjacent to each other, the transmitting conductors, the receiving conductors, the ground layer, and the like may be formed of a nontransparent material.

According to the present invention, even in the case where the metallic wiring conductors 19A (i.e., first signal lines) and the metallic wiring conductors 19B (i.e., second signal lines) are arranged adjacent to each other in the wiring region on the first glass substrate 15, the ground layer 120 set to a predetermined potential is formed to overlap the metallic wiring conductors 19A and, therefore, even when an indicator approaches the region in which the metallic wiring conductors 19A and the metallic wiring conductors 19B are arranged adjacent to each other, interference of signals between the metallic wiring conductors 19A and the metallic wiring conductors 19B can be reduced, and erroneous detection of the indicator can be prevented.

It should be understood by those skilled in the art that various modifications, combinations, sub-combinations and alterations are possible depending on design requirements and other factors, and that they are within the scope of the appended claims or the equivalents thereof.

What is claimed is:

1. A detecting sensor for detecting a position indicated by an indicator, the detecting sensor comprising:
on a base material;
a plurality of first sensor conductors arranged in a first direction;
a plurality of first signal lines electrically connected to said first sensor conductors, respectively;
a plurality of second sensor conductors arranged in a second direction intersecting said first direction;
a plurality of second signal lines electrically connected to said second sensor conductors, respectively; and
a first conductive pattern disposed between said first signal lines and said base material, the first conductive pattern being electrically insulated from said first signal lines, the first conductive pattern being set to a predetermined potential, and the first conductive pattern being made of a same material as that used to form either one of said first sensor conductors and said second sensor conductors.

2. The detecting sensor according to claim 1, wherein an insulating material for electrically insulating said first signal lines from said first conductive pattern is disposed between said first signal lines and said first conductive pattern, and
said plurality of first sensor conductors and said plurality of second sensor conductors are arranged on a same surface side of said base material, and a same insulating material as that used to form said insulating material disposed between said first signal lines and said first conductive pattern is arranged in intersection regions between said first sensor conductors and said second sensor conductors to thereby insulate said first sensor conductors from said second sensor conductors.

3. The detecting sensor according to claim 2, wherein said first sensor conductors include:
a plurality of conductor pieces arranged between said plurality of second sensor conductors; and
one or more conductive elements disposed to overlap said insulating material in the intersection regions between said first sensor conductors and said second sensor conductors,
wherein said plurality of conductor pieces are electrically connected to each other by said one or more conductive elements.

4. The detecting sensor according to claim 3, wherein said one or more conductive elements are formed of a same material as that used to form at least one of said first signal lines and said second signal lines.

5. The detecting sensor according to claim 2, wherein a second conductive pattern set to the predetermined potential is disposed between said first signal lines and said second signal lines in a region in which said plurality of second signal lines adjoins said plurality of first signal lines.

6. The detecting sensor according to claim 5, wherein said second conductive pattern is disposed on said first conductive pattern, and is electrically connected to said first conductive pattern.

7. The detecting sensor according to claim 5, wherein said second conductive pattern includes a first linear conductor and a second linear conductor both connected to said predetermined potential, and said first linear conductor is disposed on said first conductive pattern and is electrically connected to said first conductive pattern.

8. The detecting sensor according to claim 7, wherein said plurality of second signal lines are arranged to receive signals from the plurality of second sensor conductors, respectively, and said first linear conductor of said second conductive pattern disposed on said first conductive pattern is formed to have a width greater than a width of said second linear conductor, wherein signals provided to said plurality of first signal lines have a greater signal strength than those signals received by the second signal lines from the second sensor conductors.

9. The detecting sensor according to claim 1, wherein said first signal lines and said second signal lines have higher conductivity than said first sensor conductors and said second sensor conductors.

10. The detecting sensor according to claim 1, wherein said first sensor conductors, said second sensor conductors, and a region of said base material in which said first sensor conductors and said second sensor conductors are arranged have transparency.

11. The detecting sensor according to claim 1, wherein the first conductive pattern is additionally disposed between said second signal lines and said base material, the first conductive pattern being electrically insulated from said second signal lines.

12. The detecting sensor according to claim 11, wherein the first conductive pattern includes a first layer, which is disposed between said first signal lines and said base material and is electrically insulated from said first signal lines, and a second layer, which is disposed between said second signal lines and said base material and is electrically insulated from said second signal lines.

13. A detecting sensor for detecting a position indicated by an indicator, the detecting sensor comprising:
on a base material;
a plurality of first sensor conductors arranged in a first direction;
a plurality of first signal lines electrically connected to said first sensor conductors, respectively;
a plurality of second sensor conductors arranged in a second direction intersecting said first direction;
a plurality of second signal lines electrically connected to said second sensor conductors, respectively; and
a conductive pattern disposed between said first signal lines and said second signal lines in a region in which said second signal lines adjoin said first signal lines, the conductive pattern being set to a predetermined potential, and the conductive pattern being made of a same material as that used to form either one of said first sensor conductors and said second sensor conductors.

14. The detecting sensor according to claim 13, wherein said conductive pattern includes a first linear conductor and a second linear conductor both connected to said predetermined potential.

15. The detecting sensor according to claim 14, wherein said plurality of second signal lines are arranged to receive signals from the plurality of second sensor conductors, respectively, and said first linear conductor of said conductive pattern is disposed adjacent to said plurality of first signal lines while said second linear conductor is disposed adjacent to said plurality of second signal lines, and said first linear conductor is formed to have a width greater than a width of said second linear conductor, wherein signals provided to said plurality of first signal lines have a greater signal strength than those signals received by the second signal lines from the second sensor conductors.

16. An indicator position detecting device comprising:
a detecting sensor configured to detect a position indicated by an indicator; and
an electric circuit configured to supply a transmission signal to said detecting sensor and to detect the position indicated by said indicator based on a received signal obtained from said detecting sensor;
wherein said detecting sensor includes:
a base material,
a plurality of first sensor conductors arranged in a first direction on said base material,
a plurality of first signal lines provided on said base material to electrically connect said first sensor conductors, respectively, to said electric circuit,
a plurality of second sensor conductors arranged in a second direction intersecting said first direction on said base material,
a plurality of second signal lines provided on said base material to electrically connect said second sensor conductors, respectively, to said electric circuit, and
a first conductive pattern disposed between said first signal lines and said base material, the first conductive pattern being electrically insulated from said first signal lines, being made of a same material as that used to form either one of said first sensor conductors and said second sensor conductors, and being connected to a predetermined potential.

17. A method of detecting a position indicated by an indicator on a detecting sensor, comprising:
(i) providing the detecting sensor that includes:
on a base material;
a plurality of first sensor conductors arranged in a first direction;
a plurality of first signal lines electrically connected to said first sensor conductors, respectively;
a plurality of second sensor conductors arranged in a second direction intersecting said first direction;
a plurality of second signal lines electrically connected to said second sensor conductors, respectively; and
a first conductive pattern disposed between said first signal lines and said base material, the first conductive pattern being electrically insulated from said first signal lines, and the first conductive pattern being made of a same material as that used to form either one of said first sensor conductors and said second sensor conductors, and
(ii) setting the first conductive pattern to a predetermined potential.

18. The method according to claim 17, further comprising:
disposing a second conductive pattern between said first signal lines and said second signal lines in a region in which said plurality of second signal lines adjoins said plurality of first signal lines; and
setting the second conductive pattern to the predetermined potential.

19. The method according to claim 18, further comprising:
including a first linear conductor and a second linear conductor in the second conductive pattern, and disposing the first linear conductor on the first conductive pattern while electrically connecting the first linear conductor to the first conductive pattern; and
connecting both the first linear conductor and the second linear conductor to the predetermined potential.

* * * * *